United States Patent [19]
Oka et al.

[11] Patent Number: 5,948,844
[45] Date of Patent: Sep. 7, 1999

[54] POLYACETAL RESIN COMPOSITION

[75] Inventors: Mikio Oka; Tadashige Hata, both of Kurashiki, Japan

[73] Assignee: Asahi Kasei Kogyo Kabushiki Kaisha, Osaka, Japan

[21] Appl. No.: 08/981,506

[22] PCT Filed: Sep. 29, 1995

[86] PCT No.: PCT/JP95/02002

§ 371 Date: Dec. 12, 1997

§ 102(e) Date: Dec. 12, 1997

[87] PCT Pub. No.: WO97/12937

PCT Pub. Date: Apr. 10, 1997

[51] Int. Cl.$^6$ ...................................................... C08K 5/04
[52] U.S. Cl. ......................... 524/399; 523/204; 523/210; 524/400
[58] Field of Search ..................................... 524/399, 400; 554/156, 159; 528/230; 523/204, 210

[56] References Cited

U.S. PATENT DOCUMENTS

| | | |
|---|---|---|
| 3,376,327 | 4/1968 | Freeland . |
| 3,484,399 | 12/1969 | Kakos . |
| 3,553,117 | 1/1971 | Gutweiler et al. . |
| 3,743,614 | 7/1973 | Wolters et al. . |
| 4,268,643 | 5/1981 | Radici et al. . |
| 4,386,178 | 5/1983 | Schuette et al. . |
| 5,191,006 | 3/1993 | Matsumoto et al. . |

FOREIGN PATENT DOCUMENTS

| | | |
|---|---|---|
| 55-22508 | 6/1980 | Japan . |
| 60-56748 | 12/1985 | Japan . |
| 4-63857 | 2/1992 | Japan . |
| 5-48781 | 7/1993 | Japan . |
| 1425771 | 2/1976 | United Kingdom . |

*Primary Examiner*—Veronica P. Hoke
*Attorney, Agent, or Firm*—Pennie & Edmonds LLP

[57] ABSTRACT

At least one aliphatic carboxylic acid metal salt is added to a terminally-stabilized polyacetal resin, said salt having occluded therein at least one metal compound selected from the group consisting of a metal hydroxide and a metal chloride, and optionally having attached to a surface thereof at least one metal compound selected from the group consisting of a metal hydroxide and a metal chloride.

10 Claims, No Drawings

5,948,844

POLYACETAL RESIN COMPOSITION

TECHNICAL FIELD

The present invention relates to a polyacetal resin composition. More particularly, the present invention is concerned with a polyacetal resin composition comprising a terminal-stabilized polyacetal resin, and at least one aliphatic carboxylic acid metal salt added to the terminal-stabilized polyacetal resin, the at least one aliphatic carboxylic acid metal salt having occluded therein a specific amount of at least one metal compound selected from the group consisting of a metal hydroxide and a metal chloride, wherein the aliphatic carboxylic acid metal salt does not have attached to a surface thereof at least one metal compound selected from the group consisting of a metal hydroxide and a metal chloride, or has on a surface thereof a very limited specific amount of the metal compound. The polyacetal resin composition of the present invention has not only excellent thermal aging resistance, but also excellent aging discoloration resistance and excellent anti-mold deposit properties. The polyacetal resin composition of the present invention can be extremely advantageously used for various applications, especially, production of mechanical parts which will be used under high temperature conditions for a prolonged period of time (for example, mechanical parts employed in association with automobile engines).

BACKGROUND ART

Polyacetal resins not only have an excellent balance of mechanical strength, chemical resistance and sliding properties, but can also be easily processed. By virtue of these advantages, polyacetal resins are widely used, as engineering plastic materials, for a wide variety of applications including mechanical parts, such as mechanical parts for electric and electronic equipment as well as automobiles.

When a polyacetal resin is used in the above-mentioned fields, it is necessary that the polyacetal resin have good thermal aging resistance and aging discoloration resistance. Further, from the viewpoint of improving molding productivity, it is important that the polyacetal resin have good anti-mold deposit properties.

Conventionally, as a method for improving the thermal aging resistance of a polyacetal resin, it is generally known to add an aliphatic carboxylic acid metal salt to the polyacetal resin [see, for example, Examined Japanese Patent Application Publication Specification No. 55-22508 (corresponding to U.S. Pat. No. 3,743,614) and Examined Japanese Patent Application Publication Specification No. 60-56748 (corresponding to GB Patent Application Publication No. 1425771)].

However, when a conventionally known aliphatic carboxylic acid metal salt is added to a polyacetal resin, although the thermal aging resistance of the polyacetal resin can be improved to some degree, the aging discoloration resistance and anti-mold deposit properties of the polyacetal resin become low. The poor aging discoloration resistance causes a molded product to have a poor appearance. The poor anti-mold deposit properties of the polyacetal resin lead to a lowering of the molding productivity, because a set of mold halves used for molding such a polyacetal resin needs to be frequently dismantled and cleaned. It has been strongly desired in the art to solve these problems.

SUMMARY OF THE INVENTION

The present inventors have made extensive and intensive studies with a view toward solving the above-mentioned problems of the prior art. As a result, it has unexpectedly been found that when a specific aliphatic carboxylic acid metal salt is added to a terminal-stabilized polyacetal resin, wherein the aliphatic carboxylic acid metal salt has occluded therein a metal compound selected from the group consisting of a metal hydroxide and a metal chloride, and occasionally has attached to a surface thereof a metal compound selected from the group consisting of a metal hydroxide and a metal chloride, and wherein the occluded metal compound and the surface-attached metal compound are, respectively, present in an amount of from 1 to 300 ppm by weight and in an amount of from 0 to 20 ppm by weight, each based on the total weight of the aliphatic carboxylic acid metal salt, the occluded metal compound and the surface-attached metal compound, the resultant polyacetal resin composition has not only excellent thermal aging resistance, but also excellent aging discoloration resistance and excellent anti-mold deposit properties. The present invention has been completed, based on this finding.

Accordingly, it is an object of the present invention to provide a polyacetal resin composition which meets a demand such that all of excellent thermal aging resistance, excellent aging discoloration resistance and excellent anti-mold deposit properties are exhibited simultaneously, which demand has been unable to be satisfied by conventional techniques.

The foregoing and other objects, features and advantages of the present invention will be apparent from the following detailed description and appended claims.

DETAILED DESCRIPTION OF THE INVENTION

According to the present invention, there is provided a polyacetal resin composition comprising 100 parts by weight of a terminal-stabilized polyacetal resin, and from 0.01 to 3.0 parts by weight of at least one aliphatic carboxylic acid metal salt added to the terminal-stabilized polyacetal resin, the at least one aliphatic carboxylic acid metal salt having occluded therein at least one metal compound selected from the group consisting of a metal hydroxide and a metal chloride, and having attached to a surface thereof at least one metal compound selected from the group consisting of a metal hydroxide and a metal chloride, wherein the at least one occluded metal compound and the at least one surface-attached metal compound are, respectively, present in an amount of from 1 to 300 ppm by weight and in an amount of from 0 to 20 ppm by weight, each based on the total weight of the at least one aliphatic carboxylic acid metal salt, the at least one occluded metal compound and the at least one surface-attached metal compound.

The polyacetal resin composition of the present invention has excellent thermal aging resistance and excellent aging discoloration resistance, so that it solves the problems which are encountered when a shaped article produced from a conventional polyacetal resin composition is used in a high-temperature atmosphere, namely, the problems of low mechanical properties (due to unsatisfactory thermal aging resistance) and poor appearance (due to unsatisfactory aging discoloration resistance). Further, since the polyacetal resin composition of the present invention has also excellent anti-mold deposit properties, it can improve the molding productivity as well. Thus, the polyacetal resin composition of the present invention can be suitably used for molding various mechanical parts, especially mechanical parts employed in association with automobile engines.

Examined Japanese Patent Application Publication Specification No. 55-22508 and Examined Japanese Patent Application Publication Specification No. 60-56748 disclose a method for improving the thermal aging resistance of a polyacetal resin by adding an aliphatic carboxylic acid metal salt to the polyacetal resin. However, in the above-mentioned two patent documents, there is no description about the content of a metal hydroxide or a metal chloride in the aliphatic carboxylic acid metal salt to be employed, and there is no description about a method for producing the aliphatic carboxylic acid metal salt to be employed.

Examples of terminal-stabilized polyacetal resins usable in the resin composition of the present invention include a terminal-stabilized polyacetal resin obtained by a method in which an oxymethylene homopolymer consisting essentially of oxymethylene units is produced from a formaldehyde monomer or a cyclic oligomer of formaldehyde, such as formaldehyde trimer (trioxane) or a formaldehyde tetramer (tetraoxane), and the obtained oxymethylene homopolymer is subjected to a terminal stabilization treatment; and a terminal-stabilized polyacetal resin obtained by a method in which an oxymethylene-oxyalkylene copolymer, containing 0.1 to 20% by weight of oxyalkylene units having 2 to 8 carbon atoms, is produced from a mixture of the above-mentioned formaldehyde monomer or oligomer and a cyclic formal containing a hindered phenol antioxdant added in an amount of 10 to 500 ppm, and the obtained copolymer is subjected to a terminal stabilization treatment. Examples of cyclic formals as comonomers include ethylene oxide, propylene oxide, epichlorohydrin, 1,3-dioxolane 1,4-butanediol, a glycol formal and a diglycol formal. In the present invention, it is preferred that the terminal-stabilized polyacetal resin be one which generates formaldehyde gas in an amount of 600 ppm by weight or less, more preferably 300 ppm by weight or less, based on the weight of the polyacetal resin, when heated at 230 C for 60 minutes in a nitrogen stream. Examples of terminal-stabilized polyacetal resins include an oxymethylene-oxyalkylene copolymer comprising a branched molecular chain, and an oxymethylene-containing block copolymer, such as a block copolymer comprising more than 50% by weight of a polyoxymethylene (POM) block and less than 50% by weight of a polymer block (containing 50% by weight or more of recurring oxymethylene units) other than the POM block. Examples of configurations of such oxymethylene block copolymers include A—B—A and A—B configurations, wherein A represents a POM block and B represents a polymer block other than the POM block (containing 50% by weight or more of recurring oxymethylene units), the amount of the B block being less than 50% by weight of the block copolymer.

Preferred examples of hindered phenol antioxdants which can be added to comonomers, such as ethylene oxide, propylene oxide, epichlorohydrin, 1,3-dioxolane and 1,4-butanediol, include n-octadecyl-3-(3',5'-di-t-butyl-4'-hydroxyphenyl)-propionate, n-octadecyl-3-(3'-methyl- 5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], triethylene glycol-bis-[3-(3-t-butyl-5-methyl-4-hydroxyphenyl)-propionate], tetrakis[methylene-3-(3',5'-di-t-butyl-4'-hydroxyphenyl)propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-4-hydroxyphenol)propionyl hexamethylenediamine, N,N'-tetramethylenebis-3-(3'-methyl-5'-t-butyl-4-hydroxyphenol)propionyldiamine, N,N'-bis-[3-(3,5-di-t-butyl-4-hydroxyphenol)propionyl]-hydrazine, N-salicyloyl-N'-salicylidenehydrazine, 3-(N-salicyloyl)amino-1,2,4-triazole, and N,N'-bis[2-{3-(3,5-di-butyl-4-hydroxyphenyl)propionyloxy}ethyl]-oxyamide. These antioxidants can be used individually or in combination. Of these antioxidants, tetrakis-[methylene-3-(3',5'-di-t-butyl-4'-hydroxyphenyl)propionate] methane is more preferred.

With respect to the method for producing the terminal-stabilized polyacetal resin to be used in the present invention, there is no particular limitation. Customary production methods can be employed. For example, when it is desired to produce the polyacetal resin in a copolymer form, a method can be used in which trioxane and a cyclic ether as a comonomer are subjected to purification by, for example, distillation and adsorption to remove active hydrogen-containing compounds as impurities, such as water, methanol and formic acid; the monomer and comonomer are copolymerized; and the obtained copolymer is subjected to a terminal stabilization treatment using, for example, a twin-screw extruder. Examples of methods for the removal of active hydrogen-containing compounds from the raw material monomers include a method in which each of trioxane and a cyclic ether is subjected to distillation in the presence of benzene, thereby removing the active hydrogen-containing compounds by azeotropic distillation, and a method in which each of trioxane and a cyclic ether is passed through a column having packed therein an adsorbent, such as zeolite, thereby removing the impurity compounds by adsorption. In the production of the terminal-stabilized polyacetal resin, it is preferred that removal of the impurity compounds (active hydrogen-containing compounds, such as water, methanol and formic acid) from the raw material monomers be effected so that the total amount of active hydrogen(hydrogen of OH)-containing compounds in the raw material monomers becomes 20 ppm or less in terms of the amount of $H_2O$, based on the weight of the trioxane. Raw material monomers which have been subjected to removal of active hydrogen-containing compounds by distillation or adsorption, are copolymerized in the presence of a catalyst, thereby obtaining a crude polyacetal resin. The polymerization is conducted by bulk polymerization. Either of a batchwise method and a continuous method can be employed. As a batch type polymerization apparatus, a generally known reaction vessel having a stirrer can be used. As a continuous type polymerization apparatus, a self-cleaning type mixer, such as a co-kneader, a twin-screw continuous extrusion kneader or a twin-paddle type continuous mixer, can be used. The polymerization can be conducted preferably at 60 to 200° C., more preferably 60 to 120° C., under atmospheric pressure.

Examples of polymerization catalysts to be used in the polymerization reaction include boron trifluoride, boron trifluoride hydrate, and coordination compounds of an oxygen- or sulfur-containing organic compound with boron trifluoride, which may be either in gaseous form or in the form of a solution thereof in a suitable organic solvent. Of the above polymerization catalysts, the coordination compounds of an oxygen- or sulfur-containing organic compound with boron trifluoride, specifically, boron trifluoride diethyl ether and boron trifluoride dibutyl ether, are especially preferred. With respect to the amount of the polymerization catalyst, the catalyst is used in an amount of from $1\times10^{-6}$ to $1\times10^{-3}$ mol, preferably $5\times10^{-6}$ to $1\times10^{-4}$ mol per mol of the total of the trioxane and cyclic ether.

Because the obtained crude polyacetal resin contains an active polymerization catalyst, it is preferred to deactivate the polymerization catalyst prior to the terminal stabilization. As a method for deactivating a polymerization catalyst, a method of deactivating the polymerization catalyst either in water containing a basic substance or in an organic solvent containing a basic substance can be used. Further, a method of deactivating a catalyst by adding a basic substance to a crude polyacetal resin in a molten state in an extruder can be used. Examples of basic substances to be used for deactivating a polymerization catalyst include hydroxides, inorganic weak acid salts, and organic acid salts of alkali metals or alkaline earth metals. Of these, hydroxides, carbonates, phosphates, silicates, borates, formates, acetates, stearates, palmitates, propionates, oxalates and the like of lithium, sodium, potassium, magnesium, calcium, strontium and barium are preferred. Further, ammonia and amine compounds, such as triethylamine and tributylamine, can be used as a catalyst deactivator.

After deactivation of the polymerization catalyst, an obtained crude polyacetal resin is subjected to a terminal stabilization treatment. As a method for stabilizing unstable terminals of a crude polyacetal resin, there can be mentioned a method comprising the steps of (1) adding at least one hydroxyl group-containing compound (e.g., a hydroxide of an alkali metal or an alkaline earth metal) to a crude polyacetal resin in a molten state in an extruder and subsequently kneading the resultant mixture in the extruder, and (2) removing a generated gas of the hydroxyl group-containing compound added and formaldehyde produced in step (1) above, thereby removing a volatile matter from the crude polyacetal resin in a molten state to obtain a terminal-stabilized polyacetal resin. As the extruder to be used in the above method, a twin-screw extruder or the like, in which steps (1) and (2) above can be continuously conducted, can be mentioned. In step (1) (in which the at least one hydroxyl group-containing compound is added to the polymer and the resultant mixture is kneaded), it is preferred that a basic substance, such as triethylamine, be used as a pH adjusting agent. When a basic substance is used as a pH adjusting agent, the basic substance is added in an amount of 0.001 to 10% by weight, preferably 0.02 to 1.0% by weight, based on the weight of the crude polyacetal resin. When hydroxides of alkali metals or alkaline earth metals, or salts of alkali metals or alkaline earth metals with in organic weak acids or organic acids are used as the basic substance, it is preferred that the basic substance be used in an amount of from 2 to 5000 ppm by weight, more preferably from 10 to 2000 ppm by weight, based on the weight of the crude polyacetal resin. When the basic substance is used in combination with water and/or an organic solvent, it is preferred that the water and/or the organic solvent be used in an amount of from 0.01 to 10% by weight, based on the weight of the crude polyacetal resin. The temperature for the terminal stabilization treatment is selected in the range of from a melting 20 temperature of the crude polyacetal resin to 265° C., preferably from 180 to 230° C. With respect to the details of the method for stabilizing unstable terminals of a polyacetal resin, reference can be made to, for example, Examined Japanese Patent Application Publication Specification No. 58-11450 (corresponding to U.S. Pat. No. 4,366,305), Unexamined Japanese Patent Application Laid-Open Specification No. 58-152012 (corresponding to European Patent Publication No. 0 088 541) and International Patent Application No. PCT/JP95/00530.

In the production of the polyacetal resin to be used in the present invention, a hindered phenol antioxidant can be added to a reaction mixture during the polymerization reaction for producing a crude polyacetal resin or prior to the terminal stabilization treatment for the crude polyacetal resin. Examples of hindered phenol antioxidants include n-octadecyl-3-(3',5'-di-t-butyl-4'-hydroxyphenyl)-propionate, n-octadecyl-3-(3'-methyl-5'-t-butyl-4'-hydroxyphenyl)propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)propionate], triethylene glycol-bis-[3-(3-t-butyl-5-methyl-4-hydroxyphenyl)-propionate],pentaerythrityl-tetrakis-[3-(3, 5-di-t-butyl-4-hydroxyphenyl)propionate], 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-4-hydroxyphenol)propionyl hexamethylenediamine, N,N'-tetramethylenebis-3-(3'-methyl-5'-t-butyl-4-hydroxyphenol)propionyldiamine, N,N'-bis-[3-(3,5-di-t-butyl-4-hydroxyphenol)propionyl]-hydrazine, N-salicyloyl-N'-salicylidenehydrazine, 3-(N-salicyloyl)amino-1,2,4-triazole and N,N'-bis[2-{3-(3,5-di-butyl-4-hydroxyphenyl)propionyloxy}ethyl]-oxyamide. These antioxidants can be used individually or in combination. Of the above-mentioned antioxidants, triethylene glycol-bis-[3-(3-t-butyl-5-methyl-4-hydroxyphenyl)-propionate] is preferred.

The amount of formaldehyde generated from a terminal-stabilized polyacetal resin is determined in accordance with the following method. A terminal-stabilized polyacetal resin is heated in an aluminum container at 230° C. for 60 minutes in a nitrogen stream while allowing formaldehyde generated from the polyacetal resin to be absorbed in an aqueous sodium sulfite solution. The amount of the formaldehyde is determined by titration using 0.01 N sulfuric acid. It is preferred that the amount of the formaldehyde be 600 ppm by weight or less, more preferably 300 ppm by weight or less, based on the weight of the polyacetal resin.

Aliphatic carboxylic acid metal salts to be used in the present invention are saturated or unsaturated aliphatic carboxylic acid metal salts having 10 to 36 carbon atoms. In the present invention, such aliphatic carboxylic acid metal salts can be used individually or in combination. The carboxylic acid moiety of aliphatic carboxylic acid metal salts to be used in the present invention may or may not be substituted with a hydroxyl group. Examples of saturated aliphatic carboxylic acids include capric acid, lauric acid, myristic acid, palmitic acid, stearic acid, arachic acid, behenic acid, lignoceric acid, cerotic acid, montanic acid, melissic acid and ceroplastic acid. Examples of unsaturated aliphatic carboxylic acids include undecylenic acid, oleic acid, elaidic acid, cetoleic acid, erucic acid, brassidic acid, sorbic acid, linoleic acid, linolenic acid, arachidonic acid, propiolic acid and stearolic acid. Of the above-mentioned aliphatic carboxylic acids, lauric acid, stearic acid and behenic acid are preferred. In the present invention, the metal of the aliphatic carboxylic acid metal salt is selected from the group consisting of sodium, potassium, lithium, calcium, magnesium, barium, zinc, aluminum and strontium. Of these metals, calcium, magnesium, barium and zinc are preferred, and calcium, magnesium and zinc are especially preferred.

The amount of the aliphatic carboxylic acid metal salt to be added to the terminal-stabilized polyacetal resin is from 0.01 to 3.0 parts by weight, preferably 0.01 to 1.0 parts by weight, more preferably 0.01 to 0.5 parts by weight, per 100 parts by weight of the terminal-stabilized polyacetal resin. When the amount of the aliphatic carboxylic acid metal salt is less than 0.01 parts by weight, the thermal aging resistance of a polyacetal resin composition obtained from the terminal-stabilized polyacetal resin and the aliphatic carboxylic acid metal salt becomes poor. On the other hand, when the amount of the aliphatic carboxylic acid metal salt is more than 3.0 parts by weight, not only does the polyacetal resin composition undergo vigorous discoloration during aging, leading to a problem that the appearance of a molded product obtained from the polyacetal resin composition becomes poor, but also the anti-mold deposit properties of the polyacetal resin composition are lowered.

There is no particular limitation with respect to the method for producing the specific aliphatic carboxylic acid metal salt to be used in the present invention, as long as the produced aliphatic carboxylic acid metal salt has occluded therein at least one metal compound selected from the group consisting of a metal hydroxide and a metal chloride, and has attached to a surface thereof at least one metal compound selected from the group consisting of a metal hydroxide and a metal chloride, wherein the occluded metal compound and the surface-attached metal compound are, respectively, present in an amount of from 1 to 300 ppm by weight and in an amount of from 0 to 20 ppm by weight, each based on the total weight of the aliphatic carboxylic acid metal salt, the occluded metal compound and the surface-attached metal compound. The specific aliphatic carboxylic acid metal salt to be used in the present invention can be obtained by, for example, the following procedure. First, a crude aliphatic carboxylic acid metal salt product is obtained in particle form by a neutralization reaction between an aliphatic carboxylic acid and a metal hydroxide [which reaction is represented by formula (I) described below], a double decomposition reaction between an aliphatic carboxylic acid metal salt and a metal chloride [which reaction is represented by formula (II) described below], or a neutralization reaction between an aliphatic carboxylic acid and a metal oxide [which reaction is represented by formula (III) described below]. Then, the obtained crude aliphatic carboxylic acid metal salt product is repeatedly subjected to a washing treatment in which it is stirred in water and dehydrated until the amount of the surface-attached metal compound thereof becomes not more than 20 ppm by weight and the amount of the occluded metal compound thereof becomes from 1 to 300 ppm by weight, to thereby obtain a desired aliphatic carboxylic acid metal salt to be used in the present invention.

As mentioned above, in the present invention, a crude aliphatic carboxylic acid metal salt product (from which a specific aliphatic carboxylic acid metal salt to be used in the present invention can be obtained by the above-mentioned washing treatment) can be produced by, for example, the neutralization reaction represented by formula (I) below, the double decomposition reaction represented by formula (II) below or the neutralization reaction represented by formula (III) below:

$$xRCOOH + M(OH)_x \rightarrow (RCOO)_xM + xH_2O \quad (I)$$

wherein R represents an alkyl group, an alkenyl group or an alkynyl group; M represents a monovalent or multivalent metal atom; and x is an integer of 1 or more, which depends on the valence of M, $$2RCOOM + M'Cl_2 \rightarrow (RCOO)_2M' + 2MCl \quad (II)$$

wherein R represents an alkyl group, an alkenyl group or an alkynyl group; M represents a monovalent metal atom; and M' represents a divalent metal atom, $$2RCOOH + M"O \rightarrow (RCOO)_2M" + H_2O \quad (III)$$

wherein R represents an alkyl group, an alkenyl group or an alkynyl group; and M" represents a divalent metal atom.

In the neutralization reaction represented by formula (I) above, an aliphatic carboxylic acid is reacted with a metal hydroxide to thereby produce a crude aliphatic carboxylic acid metal salt product. In the production of a crude aliphatic carboxylic acid metal salt product by the reaction of formula (I), $M(OH)_x$ (metal hydroxide) is used in an excess amount relative to the amount of RCOOH (aliphatic carboxylic acid) in order to ensure that unreacted RCOOH does not remain. Therefore, unreacted $M(OH)_x$ remains, and is caused to be occluded in RCOOM (crude aliphatic carboxylic acid metal salt product) and also attached to the surface thereof.

In the double decomposition reaction represented by formula (II) above, an aliphatic carboxylic acid metal salt (RCOOM) as a starting material is reacted with a metal chloride ($M'Cl_2$) as a reactant to thereby produce a crude aliphatic carboxylic acid metal salt product [$(RCOO)_2M'$]. In the production of a crude aliphatic carboxylic acid metal salt product by the reaction of formula (II), $M'Cl_2$ (metal chloride) is used in an excess amount relative to the amount of RCOOM (aliphatic carboxylic acid metal salt as starting material) in order to ensure that unreacted RCOOM does not remain. Therefore, unreacted $M'Cl_2$ remains, and is caused to be occluded in $(RCOO)_2M'$ (crude aliphatic carboxylic acid metal salt product) and also attached to the surface thereof. In the case of the reaction of formula (II), MCl is also by-produced, so that MCl as well as $M'Cl_2$ is occluded in the obtained aliphatic carboxylic acid metal salt product and also attached to the surface thereof. For example, when the aliphatic carboxylic acid metal salt (RCOOM) as a starting material is an aliphatic carboxylic acid sodium salt and the metal chloride ($M'Cl_2$) as a reactant is calcium chloride, the obtained crude aliphatic carboxylic acid metal salt product is an aliphatic carboxylic acid calcium salt, and sodium chloride is by-produced. The by-produced sodium chloride is occluded in the obtained aliphatic carboxylic acid calcium salt product and also attached to the surface thereof, together with unreacted calcium chloride.

In the neutralization reaction represented by formula (III) above, an aliphatic carboxylic acid is reacted with a metal oxide to thereby produce a crude aliphatic carboxylic acid metal salt product. In the production of a crude aliphatic carboxylic acid metal salt product by the reaction of formula (III), M"O (metal oxide) is used in an excess amount relative to the amount of RCOOH (aliphatic carboxylic acid) in order to ensure that unreacted RCOOH does not remain. The excess M"O is usually reacted with water in the reaction system to form a metal hydroxide [$M"(OH)_x$], and the formed metal hydroxide is occluded in $(RCOO)_2M"$ (obtained crude aliphatic carboxylic acid metal salt product) and also attached to the surface thereof. However, a part of the excess M"O as it is may be occluded in $(RCOO)_2M"$ and also attached to the surface thereof.

In the reaction of formula (I), when M (metal) of $M(OH)_x$ (metal hydroxide as a reactant) is an n-valent metal, $M(OH)_x$ is used in an amount of from 1.01 to 1.1 mol, preferably from 1.01 to 1.05 mol, relative to n mol or mols of RCOOH (aliphatic carboxylic acid as a starting material).

In the reaction of formula (II), $M'Cl_2$ (metal chloride as a reactant) is used in an amount of from 1.01 to 1.1 mol, preferably from 1.01 to 1.05 mol, relative to 2 mols of RCOOM (an aliphatic carboxylic acid metal salt as a starting material).

In the reaction of formula (III), M"O (metal oxide as a reactant) is used in an amount of from 1.01 to 1.1 mol, preferably from 1.01 to 1.05 mol, relative to 2 mols of RCOOH (an aliphatic carboxylic acid as a starting material).

As shown in formula (I), when the crude aliphatic carboxylic acid metal salt product (RCOOM) to be subjected to a washing treatment is obtained by the reaction of formula (I) between an aliphatic carboxylic acid (RCOOH) and a metal hydroxide [M(OH)$_x$], the metal of the obtained aliphatic carboxylic acid metal salt product (RCOOM) to be subjected to a washing treatment [that is, the metal (M) of the metal hydroxide [M(OH)$_x$] as a reactant] is a monovalent or multivalent metal. In the present invention, examples of monovalent and multivalent metals (M) in formula (I) include sodium, potassium, lithium, calcium, magnesium, barium, zinc, aluminum and strontium.

As shown in formula (II), when the crude aliphatic carboxylic acid metal salt product [(RCOO)$_2$M'] to be subjected to a washing treatment is obtained by the reaction of formula (II) between an aliphatic carboxylic acid metal salt (RCOOM) as a starting material and a metal chloride (M'Cl$_2$) as a reactant, the metal (M) of the aliphatic carboxylic acid metal salt (RCOOM) as a starting material [that is, the metal (M) of the metal chloride (MCl) as a by-product] is a monovalent metal, and the metal (M') of the obtained crude aliphatic carboxylic acid metal salt product [(RCOO)$_2$M'] to be subjected to a washing treatment [that is, the metal (M') of the metal chloride (M'Cl$_2$) as a reactant] is a divalent metal. In the present invention, examples of monovalent metals (M) in formula (II) include sodium, potassium and lithium, and examples of divalent metals (M') in formula (II) include calcium, magnesium, barium, zinc and strontium.

As shown in formula (III), when the crude aliphatic carboxylic acid metal salt product [(RCOO)$_2$M"] to be subjected to a washing treatment is obtained by the reaction of formula (III) between an aliphatic carboxylic acid (RCOOH) as a starting material and a metal oxide (M"O) as a reactant, the metal (M") of the obtained crude aliphatic carboxylic acid metal salt product [(RCOO)$_2$M"] to be subjected to a washing treatment [that is, the metal (M") of the metal oxide (M"O) as a reactant] is a divalent metal. In the present invention, examples of divalent metals (M") in formula (III) include calcium, magnesium, barium, zinc and strontium.

When the reaction of formula (I) is employed, a crude aliphatic carboxylic acid metal salt product (RCOOM) to be subjected to a washing treatment can be produced as follows. An aliphatic carboxylic acid (RCOOH) is placed in water which has been heated to a temperature of from the melting temperature of the aliphatic carboxylic acid to 95° C., and the resultant mixture is stirred, to thereby obtain an emulsion. The obtained emulsion is cooled to a temperature of less than the melting temperature of the aliphatic carboxylic acid and then, mixed with an aqueous solution or suspension of a metal hydroxide [M(OH)$_x$]. The resultant mixture is heated to a temperature of from the melting temperature of the aliphatic carboxylic acid to 95° C. and allowed to stand for 1 to 3 hours to advance a reaction between the aliphatic carboxylic acid and the metal hydroxide. The resultant reaction mixture is subjected to filtration and dehydration, to thereby obtain a crude aliphatic carboxylic acid metal salt product.

When the reaction of formula (II) is employed, a crude aliphatic carboxylic acid metal salt product (RCOOM') to be subjected to a washing treatment can be produced as follows. An aliphatic carboxylic acid metal salt (RCOOM) as a starting material is dissolved in water which has been heated to a temperature of from 50 to 95° C., and the resultant aqueous solution is mixed with an aqueous solution of a metal chloride (M'Cl$_2$). The resultant mixture is heated to a temperature of from 50 to 95° C. and allowed to stand for 1 to 3 hours to advance a reaction between the aliphatic carboxylic acid metal salt and the metal chloride. The resultant reaction mixture is subjected to filtration and dehydration, to thereby obtain a crude aliphatic carboxylic acid metal salt product.

When the reaction of formula (III) is employed, a crude aliphatic carboxylic acid metal salt product [(RCOO)$_2$M"] to be subjected to a washing treatment can be produced as follows. An aliphatic carboxylic acid (RCOOH) is placed in water which has been heated to a temperature of from the melting temperature of the aliphatic carboxylic acid to 95° C., and the resultant mixture is stirred, to thereby obtain an emulsion. The obtained emulsion is cooled to a temperature of less than the melting temperature of the aliphatic carboxylic acid and then, mixed with an aqueous solution or suspension of a metal oxide (M"O). The resultant mixture is heated to a temperature of from the melting temperature of the aliphatic carboxylic acid to 95° C. and allowed to stand for 1 to 3 hours to advance the reaction between the aliphatic carboxylic acid and the metal oxide. The resultant reaction mixture is subjected to filtration and dehydration, to thereby obtain a crude aliphatic carboxylic acid metal salt product.

The crude aliphatic carboxylic acid metal salt product obtained by the reaction of formula (I) can be used as a starting aliphatic carboxylic acid metal salt in the reaction of formula (II).

The method for producing a crude aliphatic carboxylic acid metal salt product is not limited to those which involve the respective reactions of formulae (I), (II) and (III) above.

The thus obtained crude aliphatic carboxylic acid metal salt product is repeatedly subjected to a washing treatment in which it is stirred in water and dehydrated until the amount of the surface-attached metal compound thereof becomes not more than 20 ppm by weight and the occluded metal compound thereof becomes from 1 to 300 ppm by weight, to thereby obtain a desired aliphatic carboxylic acid metal salt to be used in the present invention.

In the present invention, it is preferred that the metal of the desired aliphatic carboxylic acid metal salt, which is obtained by the washing treatment of the crude aliphatic carboxylic acid metal salt product obtained by, for example, the reaction of formula (I), (II) or (III) above, be selected from the group consisting of divalent metals, such as calcium, magnesium, barium, zinc and strontium.

It is preferred that the metal of the occluded metal compound of the desired aliphatic carboxylic acid metal salt (which metal compound is selected from the group consisting of a metal hydroxide and a metal chloride) be selected from the group consisting of sodium, potassium, lithium, calcium, magnesium, barium, zinc and strontium.

In the present invention, when the desired aliphatic carboxylic acid metal salt obtained by the washing treatment has occluded therein a plurality of types of metal compounds, the term "amount of occluded metal compound" means the total amount of the plurality of occluded metal compounds of the desired aliphatic carboxylic acid metal salt. Likewise, in the present invention, when the desired aliphatic carboxylic acid metal salt obtained by the washing treatment has attached to a surface thereof a plurality of types of metal compounds, the term "amount of surface-attached metal compounds" means the total amount of the plurality of surface-attached metal compounds of the desired aliphatic carboxylic acid metal salt.

The amount of each of the occluded metal compound and surface-attached metal compound of the desired aliphatic carboxylic acid metal salt obtained by the washing treatment is a value determined by the following method using ion chromatography.

Two samples (first and second samples) of the same weight are taken from the desired aliphatic carboxylic acid metal salt. The first sample is placed in purified water [the amount of which water is 5 times or more (v/w) the amount of the first sample], to thereby obtain a mixture. The obtained mixture is subjected to an ultrasonic treatment at room temperature for 1 hour and then, subjected to filtration to separate the aliphatic carboxylic acid metal salt, thereby obtaining a filtrate. With respect to the obtained filtrate, the metal ions and counter ions which are present therein are quantitatively determined by ion chromatography, to thereby determine the amount ($W_1$) of the surface-attached metal compound of the aliphatic carboxylic acid metal salt. On the other hand, the second sample is placed in methanol [the amount of which methanol is 5 times or more (v/w) the amount of the second sample], to thereby obtain a mixture. The obtained mixture is subjected to an ultrasonic treatment at 60° C. for 1 hour and then, subjected to filtration to separate the aliphatic carboxylic acid metal salt, thereby obtaining a filtrate. The obtained filtrate is mixed with purified water in a volume ratio of 1:1. With respect to the resultant mixture, the metal ions and counter ions which are present therein are quantitatively determined by ion chromatography, to thereby determine the overall amount ($W_2$) of the surface-attached metal compound and occluded metal compound of the aliphatic carboxylic acid metal salt. The amount of the occluded metal compound of the aliphatic carboxylic acid metal salt can be determined by subtracting the amount ($W_1$) determined with respect to the first sample from the amount ($W_2$) determined with respect to the second sample.

The above-mentioned counter ions to the metal ions are at least one type of ions selected from the group consisting of hydroxyl ions and chlorine ions. Of these types of counter ions, hydroxyl ions cannot be directly quantitatively determined by ion chromatography. However, since metal ions and chlorine ions can be directly determined by ion chromatography, hydroxyl ions can also be quantitatively determined, based on the determined amount of metal ions, or on the determined amounts of metal ions and chlorine ions.

As mentioned above, the aliphatic carboxylic acid metal salt to be used in the present invention has occluded therein at least one metal compound selected from the group consisting of a metal hydroxide and a metal chloride, and does not have attached to a surface thereof at least one metal compound selected from the group consisting of a metal hydroxide and a metal chloride, or has on a surface thereof a very limited specific amount of the at least one metal compound. In the aliphatic carboxylic acid metal salt to be used in the present invention, the at least one occluded metal compound and the at least one surface-attached metal compound are, respectively, present in an amount of from 1 to 300 ppm by weight and in an amount of from 0 to 20 ppm by weight, each based on the total weight of the aliphatic carboxylic acid metal salt, the at least one occluded metal compound and the at least one surface-attached metal compound.

The polyacetal resin composition of the present invention is obtained by adding from 0.01 to 3.0 parts by weight of the above-mentioned aliphatic carboxylic acid metal salt to 100 parts by weight of a terminal-stabilized polyacetal resin. The polyacetal resin composition of the present invention meets a demand such that all of thermal aging resistance, excellent aging discoloration resistance and excellent anti-mold deposit properties are exhibited simultaneously. The amount of the occluded metal compound of the aliphatic carboxylic acid metal salt to be used in the present invention is from 1 to 300 ppm by weight, preferably from 1 to 50 ppm by weight, more preferably from 1 to 10 ppm by weight, based on the total weight of the aliphatic carboxylic acid metal salt, the at least one occluded metal compound and the at least one surface-attached metal compound. When the amount of the occluded metal compound of the at least one aliphatic carboxylic acid metal salt exceeds 300 ppm by weight, the aging discoloration resistance of the obtained polyacetal resin composition becomes drastically low, leading to a problem that the appearance of a molded product becomes poor. In this case, the anti-mold deposit properties of the polyacetal resin composition also become poor. When the amount of the occluded metal compound of the aliphatic carboxylic acid metal salt is less than 1 ppm by weight, the thermal aging resistance of the polyacetal resin composition becomes low. On the other hand, the amount of the surface-attached metal compound of the aliphatic carboxylic acid metal salt to be used in the present invention is from 0 to 20 ppm by weight, preferably from 0 to 10 ppm by weight, most preferably 0 ppm by weight. When the amount of the surface-attached metal compound of the aliphatic carboxylic acid metal salt exceeds 20 ppm by weight, the anti-mold deposit properties become poor.

In the present invention, if desired, various customary additives which are usually incorporated in a polyacetal resin can be used without no particular restriction. For example, at least one additive selected from the group consisting of an antioxidant, a polymer containing a formaldehyde-reactive nitrogen atom, a formic acid scavenger, a weathering agent (e.g., light stabilizer) and a mold release agent can be incorporated in the polyacetal resin composition. The amount of the additives is generally from 0.1 to 5.0 parts by weight, per 100 parts by weight of the terminal-stabilized polyacetal resin.

As an antioxidant, at least one hindered phenol antioxidant can be used. Examples of antioxidants include n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], triethylene glycol-bis-[3-(3-t-butyl-5-methyl-4-hydroxyphenyl)-propionate], tetrakis-[methylene-3-(3',5'-di-t-butyl-4'-hydroxyphenyl)propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-t-butyl-4-hydroxyphenol) propionyl hexamethylenediamine, N,N'-tetramethylenebis-3-(3'-methyl-5'-t-butyl-4hydroxyphenol)propionyldiamine, N,N'-bis-[3-(3,5-di-t-butyl-4-hydroxyphenol)propionyl] hydrazine, N-salicyloyl-N'salicylidenehydrazine, 3-(N-salicyloyl)amino-1,2,4-triazole and N,N'-bis[2-{3-(3,5-di-butyl-4-hydroxyphenyl)propionyloxy}ethyl]oxyamide. These antioxidants can be used individually or in combination.

As a polymer containing a formaldehyde-reactive nitrogen atom, a polyamide resin, such as nylon 4,6, nylon 6, nylon 6,6, nylon 6,10, nylon 6,12 and nylon 12, and a copolyamide resin, such as nylon 6/6,6/6,10 and nylon 6/6,12, can be mentioned. Further examples of polymers containing a formaldehyde-reactive nitrogen atom include a homopolymer of acrylamide or a derivative thereof, and a copolymer of acrylamide or a derivative thereof with another vinyl monomer, such as a poly-β-alanine which is obtained by polymerizing acrylamide or a derivative thereof with another vinyl monomer in the presence of a metal alcoholate. These polymers containing a formaldehyde-reactive nitrogen atom can be used individually or in combination. When the polyacetal resin composition contains a polymer containing a formaldehyde-reactive nitrogen atom, the polyacetal resin composition exhibits remarkably high retention of strength at a thermal aging resistance test in which the resin composition is heated at 150° C. for 1,000 hours.

Examples of formic acid scavengers include an amino-substituted triazine compound, an addition product between an amino-substituted triazine compound and formaldehyde, and a polycondensate between an amino-substituted triazine compound and formaldehyde.

Illustrative examples of amino-substituted triazine compounds include guanamine (2,4-diamino-sym-triazine), melamine (2,4,6-triamino-sym-triazine), N-butylmelamine, N-phenylmelamine, N,N-diphenylmelamine, N,N-diallylmelamine, N,N',N"-triphenylmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine and N,N',N'-tetracyanoethylbenzoguanamine.

Examples of addition products between an amino-substituted triazine compound and formaldehyde include N-methylolmelamine, N,N'-dimethylolmelamine and N,N', N"-trimethylolmelamine.

Examples of polycondensates between an amino-substituted triazine comopund and formaldehyde include a polycondensate between melamine and formaldehyde.

The above amino-substituted triazine compounds, addition products between an amino-substituted triazine compound and formaldehyde, and polycondensates between an amino-substituted triazine compound and formaldehyde can be used individually or in combination.

Examples of light stabilizers include a benzotriazole ultraviolet ray absorber, an oxalic anilide ultraviolet ray absorber and a hindered amine light stabilizer. Examples of benzotriazole ultraviolet ray absorbers include 2-(2'-hydroxy-5'-methyl-phenyl)benzotriazole, 2-(2'-hydroxy-3', 5'-di-t-butyl-phenyl)benzotriazole, 2-(2'-hydroxy-3',5'-di-isoamyl-phenyl)benzotriazole, 2-[2'-hydroxy-3',5'-bis-(α,α-dimethylbenzyl)-phenyl]-2H-benzotriazole and 2-(2'-hydroxy-4'-octoxyphenyl)benzotriazole. Examples of oxalic anilide ultraviolet ray absorbers include 2-ethoxy-2'-ethyloxalic acid bisanilide, 2-ethoxy-5-t-butyl-2'-ethyloxalic acid bisanilide and 2-ethoxy-3'-dodecyloxalic acid bisanilide. These ultraviolet ray absorbers can be used individually or in combination. Examples of hindered amine light stabilizers include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperdine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6, 6-tetramethylpiperidine, 4-(phenylcarbamoyloxy)-2,2,6,6-tetramethylpiperidine, bis(2,2,6,6-tetramethyl-4-piperidyl-carbonate, bis(2,2,6,6-tetramethyl-4-piperidyl)-oxalate, bis (2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}ethyl]-4-[3-(3,5-di-t-butyl-4-hydroxyphenyl)propionyloxy]2,2,6,6-tetramethylpiperidine, 5 and a condensate between 1,2,3,4-butanetetracarboxylic acid, 1,2,2,6,6-pentamethyl-4-piperidinol and β,β,β',β'-tetramethyl-3,9-[2,4,8,10-tetraoxaspiro-(5,5)undecane]diethanol. The above-mentioned hindered amine light stabilizers can be used individually or in combination, and also be used in combination with the above-mentioned ultraviolet ray absorbers.

As a mold release agent, at least one member selected from the group consisting of a fatty acid ester, a polyalkylene glycol and an amido group-containing aliphatic compound can be used. The term "fatty acid ester" mentioned herein means a fatty acid ester which is obtained from a polyhydric alcohol and a fatty acid, preferably one which is obtained by the reaction of at least one type of a saturated or unsaturated fatty acid having 10 or more carbon atoms with a polyhydric alcohol having 2 to 6 carbon atoms. Examples of polyhydric alcohols usable for producing fatty acid esters include ethylene glycol, diethylene glycol, triethylene glycol, propylene glycol, dipropylene glycol, butanediol, pentanediol, hexanediol, glycerol, diglycerol, triglycerol, threitol, erythritol, pentaerythritol, arabitol, ribitol, xylitol, sorbite, sorbitan, sorbitol and mannitol. Examples of fatty acids include capric acid, lauric acid, myristic acid, palmitic acid, stearic acid, 12-hydroxystearic acid, arachic acid, behenic acid, lignoceric acid, cerotic acid, montanic acid, melissic acid and ceroplastic acid. Examples of unsaturated aliphatic carboxylic acids include undecylenic acid, oleic acid, elaidic acid, cetoleic acid, erucic acid, brassidic acid, sorbic acid, linoleic acid, linolenic acid, arachidonic acid, propiolic acid and stearolic acid, natural fatty acids containing these unsaturated aliphatic carboxylic acids, and a mixture thereof. The above-mentioned fatty acids may or may not be substituted with a hydroxyl group. Of the above-mentioned fatty acid esters, a fatty acid ester which is obtained by the reaction of a fatty acid selected from palmitic acid, stearic acid, behenic acid and montanic acid, with a polyhydric alcohol selected from glycerol, pentaerythritol, sorbitan and sorbitol, is preferred. The above-mentioned fatty acid esters may or may not contain a hydroxyl group. For example, the fatty acid esters can be any of a monoester, a diester and a triester. Further, the fatty acid ester may contain a hydroxyl group which is blocked with boric acid or the like. Preferred examples of fatty acid esters include glycerol monopalmitate, glycerol dipalmitate, glycerol tripalmitate, glycerol monostearate, glycerol distearate, glycerol tristearate, glycerol monobehenate, glycerol dibehenate, glycerol tribehenate, glycerol monomontanate, glycerol dimontanate, glycerol trimontanate, pentaerythritol monopalmitate, pentaerythritol dipalmitate, pentaerythritol tripalmitate, pentaerythritol tetrapalmitate, pentaerythritol monostearate, pentaerythritol distearate, pentaerythritol tristearate, pentaerythritol tetrastearate, pentaerythritol monobehenate, pentaerythritol dibehenate, pentaerythritol tribehenate, pentaerythritol tetrabehanate, pentaerythritol monomontanate, pentaerythritol dimontanate, pentaerythritol trimontanate, pentaerythritol tetramontanate, sorbitan monopalmitate, sorbitan dipalmitate, sorbitan tripalmitate, sorbitan monostearate, sorbitan distearate, sorbitan tristearate, sorbitan monobehenate, sorbitan dibehenate, sorbitan tribehenate, sorbitan monomontanate, sorbitan dimontanate, sorbitan trimontanate, sorbitol monopalmitate, sorbitol dipalmitate, sorbitol tripalmitate, sorbitol monostearate, sorbitol distearate, sorbitol tristearate, sorbitol monobehenate, sorbitol dibehenate, sorbitol tribehenate, sorbitol monomontanate, sorbitol dimontanate and sorbitol trimontanate. As an example of a fatty acid ester containing a hydroxyl group blocked with boric acid or the like, there can be mentioned a boric acid ester of a glycerol monoester of a fatty acid (Unexamined Japanese Patent Application Laid-Open Specification No. 49-60762). These fatty acid ester compounds can be used individually or in combination. The polyalkylene glycol usable as a mold release agent in the present invention is, for example, one which is represented by the following formula:

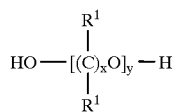

wherein each $R^1$ independently represents a hydrogen atom, an unsubstituted or substituted $C_{1-6}$ alkyl group, or an unsubstituted or substituted allyl group, x is from 2 to 6, and y is from 1,000 to 20,000.

The above-mentioned polyalkylene glycol can be obtained by a ring-opening polymerization of an alkylene oxide. Examples of alkylene oxides include ethylene oxide, propylene oxide, butylene oxide, epichlorohydrin, stylene oxide, oxetane, 3,3-bis(chloromethyl)oxetane, tetrahydrofuran, 2-methyltetrahydrofuran and oxepane. These polyalkylene glycols can be used individually or in combination. An amido group-containing aliphatic compound usable as a mold release agent in the present invention is, for example, one which is represented by the following formula:

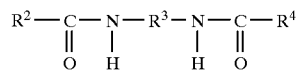

wherein each of $R^2$ and $R^4$ represents a $C_1$–$C_{30}$ alkyl group, and $R^3$ represents a $C_1$–$C_{30}$ alkylene group.

Examples of amido group-containing aliphatic compounds include ethylenebisstearylamide, ethylenebislaurylamide, ethylenebisoleylamide and ethylenebiserucic acid amide. These amide group-containing aliphatic compounds can be used individually or in combination.

With respect to the form of the additives, the additives may be added in a powdery form or in a molten form.

With respect to the method for producing the polyacetal resin composition of the present invention, there is no particular limitation. Generally, the polyacetal resin composition of the present invention can be obtained by melt-kneading in an extruder a terminal-stabilized polyacetal resin and the specific aliphatic carboxylic acid metal salt as essential components and, if desired, additives as optional components. The extruder may be a single-screw extruder or may be a twin-screw extruder. Additives may be added to a reaction system during the polymerization reaction for producing the polyacetal resin.

The extrusion temperature is not particularly restricted, and, in general, it can be appropriately selected in the range of from 170 to 240° C.

With respect to the method for molding the polyacetal resin composition of the present invention, there is no particular limitation. The polyacetal resin composition of the present invention can be molded by a conventionally known method, such as extrusion molding, injection molding, compression molding, vacuum forming, blow molding or foam molding.

BEST MODE FOR CARRYING OUT THE INVENTION

Hereinbelow, the present invention will be described in more detail with reference to the following Referential Examples, Examples and Comparative Examples, but the Examples should not be construed as limiting the scope of the present invention.

In the following Referential Examples, Examples and Comparative Examples, "ppm", "%" and "part(s)" are given by weight unless otherwise specified. Further, in Examples and Comparative Examples, measurement and evaluation of the thermal aging resistance, aging discoloration resistance and anti-mold deposit properties, and measurement of each of the amounts of the surface-attached metal compound and the occluded metal compound of an aliphatic carboxylic acid metal salt, were conducted in accordance with the following methods.

(A) Thermal aging resistance (in terms of amount of formaldehyde gas generated from a polyacetal resin):

3 g of a terminal-stabilized polyacetal resin was placed in a container made of aluminum. The terminal-stabilized polyacetal resin was heated and molten at 230° C. for 60 minutes under flowing of nitrogen gas (6 liters/hr). Then, the formaldehyde gas generated from the polyacetal resin was absorbed by a 1 mol/liter aqueous sodium sulfite solution and titrated with 0.01 N sulfuric acid, to thereby determine the amount of the formaldehyde gas generated in terms of ppm, based on the weight of the polyacetal resin.

(B) Thermal aging resistance (tensile strength retentivity):

Dumbbell specimens (20 mm×180 mm×3 mm) were prepared using the molding machine under the following conditions:

Molding machine: IS-80A (manufactured and sold by Toshiba Machine Co., Ltd., Japan)

Cylinder temperature: 200° C.

Injection pressure: 60 kg/cm²G

Injection time: 15 sec.

Cooling time: 25 sec.

Mold temperature: 70° C.

The tensile strength of one of the specimens was measured at a tensile stress rate of 5 mm/min, using Autograph AG-1000B (manufactured and sold by Shimadzu Corporation, Japan). On the other hand, another specimen was heated at 150° C. for 500 hours in a Geer oven, and the tensile strength of the heated specimen was measured in the same manner as mentioned above. From the measured tensile strength values, the tensile strength retentivity of the heated specimen was determined.

(C) Aging discoloration resistance:

A specimen obtained in the same manner as mentioned above was allowed to stand for 500 hours in a Geer oven in which a temperature had been elevated to 150° C. and then, the specimen was evaluated with respect to the color change in accordance with JIS Z-8730 using Handy color tester HC-T (manufactured and sold by Suga Test Instruments Co., Ltd., Japan). The degree of discoloration on aging was represented by the difference in color (ΔbL value) between the polyacetal resin composition to be evaluated (which contains an aliphatic carboxylic acid metal salt) and the polyacetal resin obtained in Comparative Example 1 (which contains no aliphatic carboxylic acid metal salt).

(D) Measurement of the amount of the surface-attached metal compound and the amount of the occluded metal compound of an aliphatic carboxylic acid metal salt:

Two samples (first and second samples) of the same weight were taken from the aliphatic carboxylic acid metal salt. The first sample was placed in purified water (10 ml/g of first sample), to thereby obtain a mixture. The obtained mixture was subjected to an ultrasonic treatment at room temperature for 1 hour and then, subjected to filtration to separate the aliphatic carboxylic acid metal salt, to thereby obtain a filtrate. With respect to the obtained filtrate, the metal ions which were present therein were quantitatively determined by ion chromatography using the apparatus under the conditions as described below, to thereby determine the amount ($W_1$) of the surface-attached metal compound.

The counter ions to the metal ions of the occluded metal compound or the surface-attached metal compound of the aliphatic carboxylic acid metal salt are at least one type of ions selected from the group consisting of hydroxyl ions and chlorine ions. Of these types of counter ions, hydroxyl ions cannot be directly quantitatively determined by ion chromatography. However, since metal ions and chlorine ions can be directly determined (which chlorine ions can be quantitatively determined by ion chromatography in substantially the same manner as in the determination of metal ions), hydroxyl ions can also be quantitatively determined, based on the determined amount of metal ions, or on the determined amounts of metal ions and chlorine ions. In the following Referential Examples, since the types of the negative ions of metal compounds (reactant) to be reacted with aliphatic carboxylic acids or aliphatic carboxylic acid metal salts (starting material) for the production of crude aliphatic carboxylic acid metal salt products were known, only metal ions were quantitatively determined.

[Quantitative determination of a monovalent metal ion (in the following Referential Examples, sodium ions were quantitatively determined)]

Apparatus: Conductivity detector, Water 431 (manufactured and sold by Waters, USA)

Column: Shim-pack IC-C1 (150 mm×5.0 mm) (manufactured and sold by Shimadzu Corporation, Japan)

Volume of filtrate to be applied to a column: 10 μl

Mobile phase: 5 mmol $HNO_3$ (the mobile phase had been prepared by adding a 61% aqueous $HNO_3$ solution to 1 liter of water), at 1.0 ml/min

[Quantitative determination of a divalent metal ion (in the following Referential Examples, calcium ions, magnesium ions or zinc ions were quantitatively determined)]

Apparatus: Conductivity detector, Water 431 (manufactured and sold by Waters, USA)

Column: Shim-pack IC-C1 (150 mm×5.0 mm) (manufactured and sold by Shimadzu Corporation, Japan)

Volume of filtrate to be applied to a column: 100 μl

Mobile phase: 1 mmol ethylenediamine 1 mmol tartaric acid (the mobile phase had been prepared by adding 70 μl of ethylenediamine and 153.2 mg of tartaric acid to water and adjusting the final volume to 1 liter), at 1.0 ml/min On the other hand, the second sample was placed in methanol (10 ml/g of second sample). Subsequently, the resultant mixture was subjected to an ultrasonic treatment at 60° C. for 1 hour and then, subjected to filtration to separate the aliphatic carboxylic acid metal salt, to thereby obtain a filtrate. The obtained filtrate was mixed with purified water in a volume ratio of 1:1. With respect to the resultant mixture, metal ions were quantitatively determined by ion chromatography in the same manner as mentioned above, to thereby determine the overall amount ($W_2$) of the surface-attached metal compound and occluded metal compound of the second sample. The amount of the occluded metal compound of the aliphatic carboxylic acid metal salt was determined by subtracting the amount ($W_1$) determined with respect to the first sample from the amount ($w_2$) determined with respect to the second sample.

(E) Anti-mold deposit properties:

A molded product of the polyacetal resin composition of the present invention was obtained using the molding machine under the following molding conditions:

Molding machine: IS-100E (manufactured and sold by Toshiba Machine Co., Ltd., Japan)

Cylinder temperature: 210° C.

Mold temperature: 40° C.

Injection pressure: 70 kg/cm$^2$G

Injection time: 10 sec

Cooling time: 10 sec

Suck back: 2 mm.

Subsequently, the anti-mold deposit properties of the molded product were evaluated according to the following criterion (500 shots).

○: Mold deposit was not observed

X: Mold deposit was observed in a cavity or a vent portion

Additives used in the following Examples are as follows.

(1) Hindered phenol antioxidant:

c-1: triethylene glycol-bis-[3-(3-t-butyl-5-methyl-4-hydroxyphenyl)propionate]

c-2: tetrakis[methylene-3-(3',5'-di-t-butyl-4-hydroxyphenyl)propionate]methane (2) Amide compound as a polymer containing formaldehyde-reactive nitrogen atom (thermal stabilizer):

d-1: Nylon 6,6 d-2: a poly-β-alanine copolymer containing 7 mmol of a primary amide per g of the copolymer (3) Formic acid scavenger:

e-1: melamine e-2: a polycondensation product of melamine and formaldehyde, having a molecular weight of 700 and average particle diameter of 50 μm (soluble in hot water of 60° C. or dimethyl sulfoxide)

(4) Light stabilizer:

f-1: 2-[2-hydroxy-3,5-bis(α,α-dimethylbenzyl)phenyl]-2H-benzotriazole f-2: Bis(2,2,6,6-tetramethyl-4-piperidyl)-sebacate f-3: 1-[2-{3-(3,5-di-t-butyl-4-hydroxyphenyl)propionyloxy}ethyl]-4-{3-(3,5-di-t-butyl-4-hydroxyphenyl)propionyloxy}2,2,6,6-tetramethylpiperidine f-4: a condensation product of 1,2,3,4-butanetetra-carboxylic acid, 1,2,2,6,6-pentamethyl-4-piperidinol and β,β,β',β'-tetramethyl-3,9-[2,4,8,10-tetraoxaspiro (5,5)undecane]diethanol f-5: 2-ethoxy-2'-ethyloxalic acid bisanilide (5) Mold release agent:

g-1: glycerol monostearate g-2: a polyethylene glycol (molecular weight: 6000)

g-3: ethylenebisstearylamide

REFERENTIAL EXAMPLE 1

[Production of polyacetal resin (a-1)]

A 5-liter kneader having two agitating blades and a jacket capable of circulating a heating medium was used. The internal temperature of the kneader was elevated to 80° C., and 3 kg of trioxane containing 15 ppm of water, 4.0 mol %, per mol of the trioxane, of 1,3-dioxolane to which 100 ppm of tetrakis[methylene-3-(3',5'-di-t-butyl-4-hydroxyphenyl) propionate] methane had been added, and $0.7 \times 10^{-3}$ mol of methylal as a molecular weight adjusting agent were charged into and mixed in the kneader to thereby obtain a mixture. Boron trifluoride dibutyl ether as a polymerization catalyst was added to the obtained mixture in an amount such that the final concentration of boron trifluoride dibutyl ether became $0.15 \times 10^{-4}$ mol per mol of the trioxane, and a polymerization reaction was conducted. 30 Minutes after the start of the reaction, a heating medium at 30° C. was circulated through the jacket and 2 liters of an aqueous 1% triethylamine solution was added to the reaction mixture, and the reaction mixture was further agitated for 1 hour, to thereby deactivate the catalyst and terminate the reaction. Then, the contents of the kneader were taken out, and subjected to filtration to thereby obtain a filter cake. The obtained filter cake was dried at 100° C., to thereby obtain 2.7 kg of a polyacetal resin. The above-mentioned operation was repeated until the amount of the total mass of the obtained polyacetal resin products became 10 kg. The obtained polyacetal resin mass was introduced to a twin-screw extruder (L/D ratio: 32) having one vent of (φ30 mm. The terminal stabilization reaction with removal of volatile matter of the polyacetal resin was carried out under conditions such that the internal temperature of the extruder was 200° C. and the degree of vacuum at the vent was 200 Torr, while introducing to the reaction zone of the extruder 0.2% of water and 0.1% of triethylamine (used as a basic substance), based on the weight of the polyacetal resin, to thereby obtain a terminal-stabilized polyacetal resin (a-1) in the form of pellets. With respect to the obtained polyacetal resin (a-1), the amount of formaldehyde gas generated was 1100 ppm and the MI value was 10 g/10 min.

[Production of Polyacetal Resin (a-2)]

Substantially the same procedure as in the production of polyacetal resin (a-1) was repeated, except that the degree of vacuum at the vent of the extruder was 100 Torr in the terminal stabilization reaction of the polyacetal resin, to thereby obtain terminal-stabilized polyacetal resin (a-2). With respect to the obtained polyacetal resin (a-2), the amount of formaldehyde gas generated was 540 ppm and the MI value was 10 g/10 min.

[Production of polyacetal resin (a-3)]

Substantially the same procedure as in the production of polyacetal resin (a-1) was repeated, except that the degree of vacuum at the vent of the extruder was 30 Torr in the terminal stabilization reaction of the polyacetal resin, to thereby obtain terminal-stabilized polyacetal resin (a-3). With respect to the obtained polyacetal resin (a-3), the amount of formaldehyde gas generated was 260 ppm and the MI value was 10 g/10 min.

[Production of polyacetal resin (a-4)]

A 5-liter kneader having two agitating blades and a jacket capable of circulating a heating medium was used. The internal temperature of the kneader was elevated to 80° C., and 3 kg of trioxane containing 16 ppm of water, 4.0 mol %, per mol of the trioxane, of 1,3-dioxolane to which 100 ppm of tetrakis[methylene-3-(3',5'-di-t-butyl-4-hydroxyphenyl) propionate] methane was added, and $0.7 \times 10^{-3}$ mol of methylal as a molecular weight adjusting agent were charged into and mixed in the kneader to thereby obtain a mixture. Boron trifluoride dibutyl ether as a polymerization catalyst was added to the obtained mixture in an amount such that the final concentration of boron trifluoride dibutyl ether became $0.15 \times 10^{-4}$ mol per mol of the trioxane, and a polymerization reaction was conducted. 30 Minutes after the start of the reaction, a heating medium at 30° C. was circulated through the jacket and 2 liters of an aqueous 1% triethylamine solution was added to the reaction mixture, and the reaction mixture was further agitated for 1 hour, to thereby deactivate the catalyst and terminate the reaction. Then, the contents of the kneader were taken out, and subjected to filtration to thereby obtain a filter cake. The obtained filter cake was dried at 100° C., to thereby obtain 2.7 kg of a polyacetal resin. The above-mentioned operation was repeated until the amount of the total mass of the obtained polyacetal resin products was 10 kg. To 100 parts of the obtained polyacetal resin mass was added 0.3 part of triethylene glycol-bis-[3-(3-t-butyl-5-methyl-4-hydroxyphenyl)-propionate], and the resultant mixture was introduced to a twin-screw extruder (L/D ratio: 32) having one vent of φ30 mm. The terminal stabilization reaction with removal of volatile matter of the polyacetal resin was carried out under conditions such that the internal temperature of the extruder was 200° C. and the degree of vacuum at the vent was 100 Torr, while introducing to the reaction zone of the extruder 0.2% by weight of water and 0.1% of triethylamine (used as a basic substance), based on the weight of the polyacetal resin, to thereby obtain a terminal-stabilized polyacetal resin (a-4) in the form of pellets. With respect to the obtained polyacetal resin (a-4), the amount of formaldehyde gas generated was 560 ppm and the MI value was 10 g/10 min.

With respect to the obtained polyacetal resins (a-1) to (a-4), the amounts of formaldehyde gas generated and the MI values are shown in Table 1 below.

TABLE 1

| Type of polyacetal resin | Melt index value (g/10 min) | Amount of generated formaldehyde gas (ppm) |
| --- | --- | --- |
| a-1 | 10 | 1100 |
| a-2 | 10 | 540 |
| a-3 | 10 | 260 |
| a-4 | 10 | 560 |

REFERENTIAL EXAMPLE 2

[Production of aliphatic carboxylic acid metal salt (b-1)]

57 g of stearic acid was added to 1,000 ml of purified water which had been heated to 80° C. The resultant mixture was stirred to thereby obtain an emulsion, and the obtained emulsion was cooled to 50° C. To the cooled emulsion was added an aqueous suspension of 7.8 g of calcium hydroxide in 20 ml of purified water, to thereby obtain a mixture. The molar ratio of the calcium hydroxide to the stearic acid was 1.05:2. The obtained mixture was heated to 80° C. and aged for 1 hour to advance a reaction between the stearic acid and the calcium hydroxide.

Then, the resultant reaction mixture was allowed to cool to room temperature, and subjected to filtration to thereby obtain a filter cake comprising a crude calcium stearate product. The obtained filter cake was dehydrated, and washed with purified water while stirring for 1 hour, followed by filtration and dehydration (washing treatment). The washing treatment was repeated several times until a desired calcium stearate having a $W_1$ (amount of surface-attached calcium hydroxide of the desired calcium stearate) of 10 ppm and a $W_2$ (overall amount of surface-attached calcium hydroxide and occluded calcium hydroxide, of the desired calcium stearate) of 275 ppm was obtained. Each of the $W_1$ and $W_2$ was determined by the method described in item (D) above. The thus obtained desired calcium stearate was designated as aliphatic carboxylic acid metal salt (b-1).

[Production of aliphatic carboxylic acid metal salt (b-2)]

Substantially the same procedure as in the production of aliphatic carboxylic acid metal salt (b-1) was conducted, except that the washing treatment was repeated until a calcium stearate having a $W_1$ value of 0 and a $W_2$ value of 48 (ppm) was obtained. The thus obtained desired calcium stearate was designated as aliphatic carboxylic acid metal salt (b-2).

[Production of aliphatic carboxylic acid metal salt (b-3)]

Substantially the same procedure as in the production of aliphatic carboxylic acid metal salt (b-1) was conducted, except that the washing treatment was repeated until a calcium stearate having a $W_1$ value of 0 and a $W_2$ value of 4 (ppm) was obtained. The thus obtained desired calcium stearate was designated as aliphatic carboxylic acid metal salt (b-3).

[Production of aliphatic carboxylic acid metal salt (b-4)]

Substantially the same procedure as in the production of aliphatic carboxylic acid metal salt (b-1) was conducted, except that the washing treatment was repeated until a calcium stearate having a $W_1$ value of 0 and a $W_2$ value of 0 was obtained. The thus obtained desired calcium stearate was designated as aliphatic carboxylic acid metal salt (b-4).

[Production of Aliphatic Carboxylic Acid Metal Salt (b-5)]

57 g of stearic acid was added to 1,000 ml of purified water which had been heated to 80° C. The resultant mixture was stirred to thereby obtain an emulsion, and the obtained emulsion was cooled to 50° C. To the cooled emulsion was added an aqueous solution of 8.4 g of sodium hydroxide in 40 ml of purified water, to thereby obtain a mixture. The molar ratio of the sodium hydroxide to the stearic acid was 1.05:1. The obtained mixture was heated to 80° C. and aged for 1 hour to advance a reaction between the stearic acid and the sodium hydroxide.

Then, the resultant reaction mixture was allowed to cool to room temperature, and subjected to filtration to thereby obtain a filter cake. The obtained filter cake was dehydrated, and washed with purified water while stirring for 1 hour, followed by filtration and dehydration (washing treatment). Then, the washing treatment was further repeated twice, to thereby obtain sodium stearate. 40 g of the obtained sodium stearate was dissolved in 1,000 ml of purified water which had been heated to 80° C., while stirring. To the resultant mixture was added an aqueous solution of 7.5 g of calcium chloride in 20 ml of purified water, to thereby obtain a mixture. The molar ratio of the calcium chloride to the sodium stearate was 1.05:2. 1 Hour later, the obtained mixture was subjected to filtration and dehydration, to thereby obtain a filter cake comprising a crude calcium stearate product. With respect to the obtained filter cake, the above-mentioned washing treatment was repeated several times until a desired calcium stearate having a $W_1$ (amount of surface-attached calcium chloride and sodium chloride of the desired calcium stearate) of 7 ppm and a $W_2$ (overall amount of the surface-attached calcium chloride and sodium chloride and the occluded calcium chloride and sodium chloride, of the desired calcium stearate) of 112 ppm was obtained. Each of the $W_1$ and $W_2$ was determined by the method described in item (D) above. The thus obtained desired calcium stearate was designated as aliphatic carboxylic acid metal salt (b-5).

[Production of Aliphatic Carboxylic Acid Metal Salt (b-6)]

40 g of lauric acid was added to 1,000 ml of purified water which had been heated to 50° C. The resultant mixture was stirred to thereby obtain an emulsion, and the obtained emulsion was cooled to 25° C. To the cooled emulsion was added an aqueous suspension of 7.8 g of calcium hydroxide in 20 ml of purified water, to thereby obtain a mixture. The molar ratio of the calcium hydroxide to the lauric acid was 1.05:2. The obtained mixture was heated to 50° C. and aged for 1 hour to advance a reaction between the lauric acid and the calcium hydroxide.

Then, the resultant reaction mixture was allowed to cool to room temperature, and subjected to filtration to thereby obtain a filter cake comprising a crude calcium stearate product. The obtained filter cake was dehydrated, and washed with purified water while stirring for 1 hour, followed by filtration and dehydration (washing treatment). The washing treatment was repeated several times until a desired calcium stearate having a $W_1$ (amount of surface-attached calcium hydroxide of the desired calcium stearate) of 13 ppm and a $W_2$ (overall amount of surface-attached calcium hydroxide and occluded calcium hydroxide, of the desired calcium stearate) of 281 ppm was obtained. Each of the $W_1$ and $W_2$ was determined by the method described in item (D) above. The thus obtained desired calcium stearate was designated as aliphatic carboxylic acid metal salt (b-6).

[Production of Aliphatic Carboxylic Acid Metal Salt (b-7)]

60 g of behenic acid was added to 1,000 ml of purified water which had been heated to 90° C. The resultant mixture was stirred to thereby obtain an emulsion, and the obtained emulsion was cooled to 50° C. To the cooled emulsion was added an aqueous suspension of 6.8 g of calcium hydroxide in 20 ml of purified water, to thereby obtain a mixture. The molar ratio of the calcium hydroxide to the behenic acid was 1.05:2. The obtained mixture was heated to 90° C. and aged for 1 hour to advance a reaction between the behenic acid and the calcium hydroxide.

Then, the resultant reaction mixture was allowed to cool to room temperature, and subjected to filtration to thereby obtain a filter cake comprising a crude calcium behenate product. The obtained filter cake was dehydrated, and washed with purified water while stirring for 1 hour, followed by filtration and dehydration (washing treatment). The washing treatment was repeated several times until a desired calcium behenate having a $W_1$ (amount of surface-attached calcium hydroxide of the desired calcium behenate) of 10 ppm and a $W_2$ (overall amount of surface-attached calcium hydroxide and occluded calcium hydroxide, of the desired calcium behenate) of 294 ppm was obtained. Each of the $W_1$ and $W_2$ was determined by the method described in item (D) above. The thus obtained desired calcium behenate was designated as aliphatic carboxylic acid metal salt (b-7).

[Production of Aliphatic Carboxylic Acid Metal Salt (b-8)]

57 g of stearic acid was added to 1,000 ml of purified water which had been heated to 80° C. The resultant mixture was stirred to thereby obtain an emulsion, and the obtained emulsion was cooled to 50° C. To the cooled emulsion was added an aqueous suspension of 6.1 g of magnesium hydroxide in 20 ml of purified water, to thereby obtain a mixture. The molar ratio of the magnesium hydroxide to the stearic acid was 1.05:2. The obtained mixture was heated to 80° C. and aged for 1 hour to advance a reaction between the stearic acid and the magnesium hydroxide.

Then, the resultant reaction mixture was allowed to cool to room temperature, and subjected to filtration to thereby obtain a filter cake comprising a crude magnesium stearate product. The obtained filter cake was dehydrated, and washed with purified water while stirring for 1 hour, followed by filtration and dehydration (washing treatment). The washing treatment was repeated several times until a desired magnesium stearate having a $W_1$ (amount of surface-attached magnesium hydroxide of the desired magnesium stearate) of 17 ppm and a $W_2$ (overall amount of surface-attached magnesium hydroxide and occluded magnesium hydroxide, of the desired magnesium stearate) of 281 ppm was obtained. Each of the $W_1$ and $W_2$ was determined by the method described in item (D) above. The thus obtained desired magnesium stearate was designated as aliphatic carboxylic acid metal salt (b-8).

[Production of Aliphatic Carboxylic Acid Metal Salt (b-9)]

57 g of stearic acid was added to 1,000 ml of purified water which had been heated to 80° C. The resultant mixture was stirred to thereby obtain an emulsion, and the obtained emulsion was cooled to 50° C. To the cooled emulsion was added an aqueous suspension of 10.4 g of zinc hydroxide in 20 ml of purified water, to thereby obtain a mixture. The molar ratio of the zinc hydroxide to the stearic acid was 1.05:2. The obtained mixture was heated to 80° C. and aged for 1 hour to advance a reaction between the stearic acid and the zinc hydroxide.

Then, the resultant reaction mixture was allowed to cool to room temperature, and subjected to filtration to thereby obtain a filter cake comprising a crude zinc stearate product. The obtained filter cake was dehydrated, and washed with purified water while stirring for 1 hour, followed by filtration and dehydration (washing treatment). The washing treatment was repeated several times until a desired zinc stearate having a $W_1$ (amount of surface-attached zinc hydroxide of the desired zinc stearate) of 15 ppm and a $W_2$ (overall amount of surface-attached zinc hydroxide and occluded zinc hydroxide, of the desired zinc stearate) of 263 ppm was obtained. Each of the $W_1$ and $W_2$ was determined by the method described in item (D) above. The thus obtained desired zinc stearate was designated as aliphatic carboxylic acid metal salt (b-9).

[Production of Aliphatic Carboxylic Acid Metal Salt (b-10)]

500 g of aliphatic carboxylic acid metal salt (b-3), and 260 ppm of calcium hydroxide, based on the weight of aliphatic carboxylic acid metal salt (b-3), were charged into a 3-liter Henschel mixer having a jacket. The temperature of the jacket of the Henschel mixer was elevated so that the temperature of the contents of the mixer became 40° C. Subsequently, the contents of the mixer were mixed together at 860 rpm for 5 minutes to thereby obtain aliphatic carboxylic acid metal salt (b-10) in which the calcium hydroxide was attached to the surface of aliphatic carboxylic acid metal salt (b-3). No calcium hydroxide was occluded in aliphatic carboxylic acid metal salt (b-3) at all, because the aliphatic carboxylic acid metal salt (b-3) could not be melted at 40° C. The amount ($W_1$) of surface-attached calcium hydroxide of aliphatic carboxylic acid metal salt (b-10) was 250 ppm.

[Production of Aliphatic Carboxylic Acid Metal Salt (b-11)]

Substantially the same procedure as in the production of aliphatic carboxylic acid metal salt (b-1) was conducted, except that the washing treatment was repeated until a calcium stearate having a $W_1$ value of 0 and a $W_2$ value of 1 (ppm) was obtained. The thus obtained desired calcium stearate was designated as aliphatic carboxylic acid metal salt (b-11).

[Production of Aliphatic Carboxylic Acid Metal Salt (b-12)]

Substantially the same procedure as in the production of aliphatic carboxylic acid metal salt (b-1) was conducted, except that the washing treatment was repeated until a calcium stearate having a $W_1$ value of 31 (ppm) and a $W_2$ value of 851 (ppm) was obtained. The thus obtained desired calcium stearate was designated as aliphatic carboxylic acid metal salt (b-12).

With respect to each of the above-obtained aliphatic carboxylic acid metal salts (b-1) to (b-12), the amount ($W_1$) of the surface-attached metal compound, the overall amount ($W_2$) of the surface-attached metal compound and the occluded metal comopund, and the amount ($W_2$-$W_1$) of the occluded metal compound are shown in Table 2.

TABLE 2

| | | | Surface-attached and occluded metal compound or compounds | | |
|---|---|---|---|---|---|
| | Type of aliphatic acid metal salt | Type | Amount of surface-attached metal compound ($W_1$) (ppm) | Overall amount of surface-attached and occluded metal compound or compounds ($W_2$) (ppm) | Amount of occluded metal compound ($W_2$-$W_1$) (ppm) |
| b-1 | Calcium stearate | Ca(OH)$_2$ | 10 | 275 | 265 |
| b-2 | Calcium stearate | Ca(OH)$_2$ | 0 | 48 | 48 |
| b-3 | Calcium stearate | Ca(OH)$_2$ | 0 | 4 | 4 |
| b-4 | Calcium stearate | Ca(OH)$_2$ | 0 | 0 | 0 |
| b-5 | Calcium stearate | CaC$_2$ NaCl | 7 | 112 | 105 |
| b-6 | Calcium laurate | Ca(OH)$_2$ | 13 | 281 | 268 |
| b-7 | Calcium behenate | Ca(OH)$_2$ | 10 | 294 | 284 |
| b-8 | Magnesium stearate | Mg(OH)$_2$ | 17 | 281 | 264 |
| b-9 | Zinc stearate | Zn(OH)$_2$ | 15 | 263 | 248 |
| b-10* | Calcium stearate | Ca(OH)$_2$ | 250 | 254 | 4 |
| b-11 | Calcium stearate | Ca(OH)$_2$ | 0 | 1 | 1 |
| b-12 | Calcium stearate | Ca(OH)$_2$ | 31 | 851 | 820 |

[Note]*: Aliphatic carboxylic acid metal salt (b-10) was obtained by treating aliphatic carboxylic acid metal salt (b-3) with calcium hydroxide so that 250 ppm of calcium hydroxide was attached to the surface thereof.

EXAMPLE 1

1.5 kg of polyacetal resin (a-1) [the amount of formaldehyde gas generated from polyacetal resin (a-1) was 1,100 ppm], and 0.1 part, relative to 100 parts of the polyacetal resin (a-1), of aliphatic carboxylic acid metal salt (b-3) were charged into a 3-liter Henschel mixer. The temperature of a jacket of the Henschel mixer was elevated so that the temperature of the contents of the mixer became 40° C. Subsequently, the contents of the Henschel mixer were mixed together at 860 rpm for 2 minutes to thereby obtain a mixture and then, the obtained mixture was taken out of the Henschel mixer. The above-mentioned operation was repeated until the total amount of the obtained mixtures became 10 kg. 10 kg of the obtained mixtures was introduced to a twin-screw extruder (L/D ratio: 32) having one vent of ϕ30 mm. The extrusion was conducted under conditions such that the internal temperature of the extruder was 200° C., the extrusion rate was 5 kg/hr, the revolution rate of the screw was 100 rpm, and the degree of vacuum at the vent was 30 Torr, to thereby obtain a polyacetal resin composition. The obtained polyacetal resin composition was pelletized by a cutter. The pelletized polyacetal resin composition was dried at 80° C. for 5 hours and then, charged into a molding machine IS-80A (manufactured and sold by Toshiba Machine Co., Ltd., Japan), to thereby obtain a dumbbell specimen (20 mm×180 mm×3 mm). The molding conditions were as follows: the cylinder temperature was 200° C., the injection pressure was 60 kg/cm$^2$G, the injection time was 15 seconds, the cooling time was 25 seconds, and the mold temperature was 70° C. The obtained specimen was allowed to stand still in a thermostat for 2 days under conditions such that the temperature was 23° C. and the relative humidity was 50%. With respect to the resultant specimen, the thermal aging resistance, aging discoloration resistance and anti-mold deposit properties were evaluated. Results are shown in Table 3.

EXAMPLES 2 TO 6 AND COMPARATIVE EXAMPLES 1 AND 2

Substantially the same procedure as in Example 1 was repeated, except that the amounts of aliphatic carboxylic acid metal salts were changed as shown in Table 3. Results are shown in Table 3.

EXAMPLES 7 TO 13

Substantially the same procedure as in Example 1 was repeated, except that the types of aliphatic carboxylic acid metal salts were changed as shown in Table 3. Results are shown in Table 4.

EXAMPLES 14

Substantially the same procedure as in Example 1 was repeated, except that polyacetal resin (a-2) [the amount of formaldehyde gas generated from polyacetal resin (a-2) was 540 ppm] was used instead of polyacetal resin (a-1). Results are shown in Table 4.

EXAMPLE 15

Substantially the same procedure as in Example 1 was repeated, except that polyacetal resin (a-3) [the amount of formaldehyde gas generated from polyacetal resin (a-3) was 260 ppm] was used instead of polyacetal resin (a-1). Results are shown in Table 4.

Comparative Example 3

Substantially the same procedure as in Example 1 was repeated, except that aliphatic carboxylic acid metal salt (b-4) [aliphatic carboxylic acid metal salt (b-4) did not have any metal compound occluded therein] was used instead of aliphatic carboxylic acid metal salt (b-3). Results are shown in Table 4.

Comparative Example 4

Substantially the same procedure as in Example 1 was repeated, except that aliphatic carboxylic acid metal salt (b-10) [aliphatic carboxylic acid metal salt (b-10) had been obtained by bonding 250 ppm of calcium hydroxide to the surface of aliphatic carboxylic acid metal salt (b-3)] was used instead of aliphatic carboxylic acid metal salt (b-3). Results are shown in Table 4.

EXAMPLE 16

1.5 kg of polyacetal resin (a-1) [the amount of formaldehyde gas generated from polyacetal resin (a-1) was 1,100 ppm], and 0.03 part of aliphatic carboxylic acid metal salt (b-3), 0.2 part of triethylene glycol-bis-[3-(3-t-butyl-5-methyl-4-hydroxyphenyl)propionate] as a hindered phenol antioxidant, 0.025 part of nylon 6,6, and 0.1 part of glycerol monostearate, each relative to 100 parts of the polyacetal resin (a-1), were charged into a 3-liter Henschel mixer. A specimen of a polyacetal resin composition was obtained in substantially the same manner as in Example 1. With respect to the obtained specimen, the thermal aging resistance, aging discoloration resistance and anti-mold deposit properties were evaluated. Results are shown in Table 5.

EXAMPLE 17

Substantially the same procedure as in Example 16 was repeated, except that polyacetal resin (a-3) [the amount of formaldehyde gas generated from polyacetal resin (a-3) was 260 ppm] was used instead of polyacetal resin (a-1). Results are shown in Table 5.

Comparative Example 5

Substantially the same procedure as in Example 16 was repeated, except that aliphatic carboxylic acid metal salt (b-10) [aliphatic carboxylic acid metal salt (b-10) had been obtained by bonding 250 ppm of calcium hydroxide to the surface of aliphatic carboxylic acid metal salt (b-3)] was used instead of aliphatic carboxylic acid metal salt (b-3). Results are shown in Table 5.

EXAMPLE 18

1.5 kg of polyacetal resin (a-1) [the amount of formaldehyde gas generated from polyacetal resin (a-1) was 1,100 ppm], and 0.1 part of aliphatic carboxylic acid metal salt (b-3), and 0.3 part of tetrakis[methylene-3-(3',5'-di-t-butyl-4'-hydroxyphenyl)propionate]methane as a hindered phenol antioxidant and 0.2 part of ethylenebisstearylamide, each relative to 100 parts of the polyacetal resin (a-1), were charged into a 3-liter Henschel mixer. A specimen of a polyacetal resin composition was obtained in substantially the same manner as in Example 1. With respect to the obtained specimen, the thermal aging resistance, aging discoloration resistance and anti-mold deposit properties were evaluated. Results are shown in Table 5.

EXAMPLE 19

Substantially the same procedure as in Example 18 was repeated, except that polyacetal resin (a-3) [the amount of formaldehyde gas generated from polyacetal resin (a-3) was 260 ppm] was used instead of polyacetal resin (a-1). Results are shown in Table 5.

Comparative Example 6

Substantially the same procedure as in Example 18 was repeated, except that aliphatic carboxylic acid metal salt (b-10) [aliphatic carboxylic acid metal salt (b-10) had been obtained by bonding 250 ppm of calcium hydroxide to the surface of aliphatic carboxylic acid metal salt (b-3)] was used instead of aliphatic carboxylic acid metal salt (b-3). Results are shown in Table 5.

EXAMPLE 20

1.5 kg of polyacetal resin (a-1) [the amount of formaldehyde gas generated from polyacetal resin (a-1) was 1,100 ppm], and 0.2 part of aliphatic carboxylic acid metal salt (b-3), 0.3 part of triethylene glycol-bis-[3-(3-t-butyl-5-methyl-4-hydroxyphenyl)propionate] as a hindered phenol antioxidant, 0.05 part of nylon 6,6, 0.2 part of glycerol monostearate, 0.6 part of a polyethylene glycol (molecular weight: 6,000), and 0.3 part of melamine, each relative to 100 parts of the polyacetal resin (a-1), were charged into a 3-liter Henschel mixer. A specimen of a polyacetal resin composition was obtained in substantially the same manner as in Example 1. With respect to the obtained specimen, the thermal aging resistance, aging discoloration resistance and anti-mold deposit properties were evaluated. Results are shown in Table 6.

EXAMPLE 21

Substantially the same procedure as in Example 20 was repeated, except that polyacetal resin (a-3) [the amount of formaldehyde gas generated from polyacetal resin (a-3) was 260 ppm] was used instead of polyacetal resin (a-1). Results are shown in Table 6.

Comparative Example 7

Substantially the same procedure as in Example 20 was repeated, except that aliphatic carboxylic acid metal salt (b-1) [aliphatic carboxylic acid metal salt (b-10) had been obtained by bonding 250 ppm of calcium hydroxide to the surface of aliphatic carboxylic acid metal salt (b-3)] was used instead of aliphatic carboxylic acid metal salt (b-3). Results are shown in Table 6.

Example 22

1.5 kg of polyacetal resin (a-1) [the amount of formaldehyde gas generated from polyacetal resin (a-1) was 1,100 ppm], and 0.05 part of aliphatic carboxylic acid metal salt (b-3), 0.05 part of nylon 6,6, 0.35 part of ethylenebisstearylamide, 0.5 part of 2-[2-hydroxy-3,5-bis(α,α-dimethylbenzyl)phenyl]-2H-benzotriazole, 0.25 part of bis(2,2,6,6-tetramethyl-4-piperidyl)-sebacate, and 0.3 part of melamine, each relative to 100 parts of the polyacetal resin (a-1), were charged into a 3-liter Henschel mixer. A specimen of a polyacetal resin composition was obtained in substantially the same manner as in Example 1. With respect to the obtained specimen, the thermal aging resistance, aging discoloration resistance and anti-mold deposit properties were evaluated. Results are shown in Table 7.

EXAMPLE 23

Substantially the same procedure as in Example 22 was repeated, except that polyacetal resin (a-3) [the amount of formaldehyde gas generated from polyacetal resin (a-3) was 260 ppm] was used instead of polyacetal resin (a-1). Results are shown in Table 7.

Comparative Example 8

Substantially the same procedure as in Example 22 was repeated, except that aliphatic carboxylic acid metal salt (b-10) [aliphatic carboxylic acid metal salt (b-10) had been obtained by bonding 250 ppm of calcium hydroxide to the surface of aliphatic carboxylic acid metal salt (b-3)] was used instead of aliphatic carboxylic acid metal salt (b-3). Results are shown in Table 7.

EXAMPLE 24

1.5 kg of polyacetal resin (a-1) [the amount of formaldehyde gas generated from polyacetal resin (a-1) was 1,100 ppm], and 0.05 part of aliphatic carboxylic acid metal salt (b-3), 0.1 part of nylon 6,6, 0.3 part of triethylene glycol-bis-[3-(3-t-butyl-5-methyl-4-hydroxyphenyl)propionate] as a hindered phenol antioxidant, and 0.075 part of 1-[2-{3-(3,5-di-t-butyl-4-hydroxyphenyl)propionyloxy}ethyl]-4-{3-(3,5-di-t-butyl-4-hydroxyphenyl)propionyloxy} 2,2,6,6-tetramethylpiperdine], each relative to 100 parts of the polyacetal resin (a-1), were charged into a 3-liter Henschel mixer. A specimen of a polyacetal resin composition was obtained in substantially the same manner as in Example 1. With respect to the obtained specimen, the thermal aging resistance, aging discoloration resistance and anti-mold deposit properties were evaluated. Results are shown in Table 8.

EXAMPLE 25

Substantially the same procedure as in Example 24 was repeated, except that polyacetal resin (a-3) [the amount of formaldehyde gas generated from polyacetal resin (a-3) was 260 ppm] was used instead of polyacetal resin (a-1). Results are shown in Table 8.

Comparative Example 9

Substantially the same procedure as in Example 24 was repeated, except that aliphatic carboxylic acid metal salt (b-10) [aliphatic carboxylic acid metal salt (b-10) had been obtained by bonding 250 ppm of calcium hydroxide to the surface of aliphatic carboxylic acid metal salt (b-3)] was used instead of aliphatic carboxylic acid metal salt (b-3). Results are shown in Table 8.

EXAMPLE 26

1.5 kg of polyacetal resin (a-1) [the amount of formaldehyde gas generated from polyacetal resin (a-1) was 1,100 ppm], and 0.05 part of aliphatic carboxylic acid metal salt (b-3), 0.05 part of nylon 6,6, 0.05 part of ethylenebisstearylamide, 0.5 part of 2-[2-hydroxy-3,5-bis(α,α-dimethylbenzyl)phenyl]-2H-benzotriazole, 0.25 part of bis(2,2,6,6-tetramethyl-4-piperidyl)-sebacate, 1.0 part of a polyethylene glycol (molecular weight: 6,000), 0.3 part of melamine, and 0.25 part of a condensation product of 1,2,3,4-butane-tetra-carboxylic acid, 1,2,2,6,6-pentamethyl-4-piperidinol and β,β,β',β'-tetramethyl-3,9-[2,4,8,10-tetraoxaspiro(5,5)undecane]-diethanol, each relative to 100 parts of the polyacetal resin (a-1), were charged into a 3-liter Henschel mixer. A specimen of a polyacetal resin composition was obtained in substantially the same manner as in Example 1. With respect to the obtained specimen, the thermal aging resistance, aging discoloration resistance and anti-mold deposit properties were evaluated. Results are shown in Table 9.

EXAMPLE 27

Substantially the same procedure as in Example 26 was repeated, except that polyacetal resin (a-3) [the amount of formaldehyde gas generated from polyacetal resin (a-3) was 260 ppm] was used instead of polyacetal resin (a-1). Results are shown in Table 9.

Comparative Example 10

Substantially the same procedure as in Example 26 was repeated, except that aliphatic carboxylic acid metal salt (b-10) [aliphatic carboxylic acid metal salt (b-10) had been obtained by bonding 250 ppm of calcium hydroxide to the surface of aliphatic carboxylic acid metal salt (b-3)] was used instead of aliphatic carboxylic acid metal salt (b-3). Results are shown in Table 9.

EXAMPLE 28

Substantially the same procedure as in Example 17 was repeated, except that 0.1 part of a poly-β-alanine copolymer containing 7 mmol of a primary amide per gram of the copolymer was used instead of 0.025 part of nylon 6,6. Results are shown in Table 10.

EXAMPLE 29

Substantially the same procedure as in Example 27 was repeated, except that 0.3 part of a polycondensation product of melamine and formaldehyde, having a molecular weight of 700 and an average particle diameter of 50 μm (soluble in hot water of 60° C. or dimethyl sulfoxide) was used instead of 0.3 part of melamine. Results are shown in Table 10.

EXAMPLE 30

Substantially the same procedure as in Example 23 was repeated, except that 0.5 part of 2-ethoxy-2'-ethyloxalic acid bisanilide was used instead of 0.5 part of 2-[2-hydroxy-3,5-bis-(α,α-dimethylbenzyl)phenyl]-2H-benzotriazole. Results are shown in Table 10.

EXAMPLE 31

Substantially the same procedure as in Example 1 was repeated, except that polyacetal resin (a-4) [the amount of formaldehyde gas generated from polyacetal resin (a-4) was 560 ppm] was used instead of polyacetal resin (a-1). Results are shown in Table 10.

EXAMPLE 32

Substantially the same procedure as in Example 1 was repeated, except that aliphatic carboxylic acid metal salt (b-11) was used instead of aliphatic carboxylic acid metal salt (b-3). Results are shown in Table 11.

Comparative Example 11

Substantially the same procedure as in Example 1 was repeated, except that aliphatic carboxylic acid metal salt (b-12) was used instead of aliphatic carboxylic acid metal salt (b-3). Results are shown in Table 11.

As apparent from Tables 3 to 11, the polyacetal resin composition of the present invention comprising a polyacetal resin, and an aliphatic carboxylic acid metal salt having occluded therein a specific amount of a metal compound, wherein the aliphatic carboxylic acid metal salt does not have attached to a surface thereof a metal compound or has on a surface thereof a very limited specific amount of the metal compound, has excellent thermal aging resistance, aging discoloration resistance and anti-mold deposit properties.

Evaluation of Light Resistance 0.2 part of carbon black (acetylene black) was blended with 100 parts of each of the pelletized polyacetal resin compositions obtained in Examples 22, 23, 24, 25, 26, 27, 29 and 30, to thereby obtain a mixture. The obtained mixture was introduced to a single-screw extruder (L/D ratio: 22) having no vent, and extruded while melt-kneading. The extrusion was conducted under conditions such that the internal temperature of the extruder was 200° C., the revolution rate of the screw was 100 rpm, and the extrusion rate was 3 kg/hr, to thereby obtain colored pellets. The obtained colored pellets were dried at 80° C. for 5 hours and then, molded into a flat plate (67 mm×13 mm×3 mm) using the injection molding machine under the following conditions:

Molding machine: IS-100E-3A (manufactured and sold by Toshiba Machine Co., Ltd., Japan)

Cylinder temperature: 200° C.

Injection pressure: 40 kg/cm$^2$G

Injection time: 15 sec

Cooling time: 25 sec

Mold temperature: 70° C.

The obtained flat plate was examined with respect to light resistance under the following conditions, and evaluated with respect to the difference in color (ΔE value) in accordance with JIS Z-8730 using the following apparatus.

(Light Resistance Test)

Apparatus: EL-SUN-HC-B.EM Type fadeometer (manufactured and sold by Suga Test Instruments Co., Ltd., Japan)

Black panel temperature: 83° C.

Exposure period: 400 hours (Difference in Color)

Apparatus: Handy color tester HC-T (manufactured and sold by Suga Test Instruments Co., Ltd., Japan)

The flat plate was also evaluated with respect to development of cracks, as follows. The exposed surface of the flat plate was observed using a microscope at 100 magnification as to whether or not cracks were developed.

As a result of the above tests, all of the flat plates showed no difference in color (ΔE value), and showed no cracks on the surfaces thereof.

TABLE 3

|  | Polyacetal resin | | Aliphatic carboxylic acid metal salt | | After aging (150° C., 500 hrs.) | | |
| --- | --- | --- | --- | --- | --- | --- | --- |
|  | Type | Amount (parts by weight) | Type | Amount (parts by weight) | Tensile strength retentivity | Degree of discoloration (ΔbL value) | Anti-mold deposit property |
| Example 1 | a-1 | 100 | b-3 | 0.1 | 100% | 1.6 | o |
| Example 2 | a-1 | 100 | b-3 | 0.01 | 100% | 1.4 | o |
| Example 4 | a-1 | 100 | b-3 | 0.5 | 100% | 1.9 | o |
| Example 5 | a-1 | 100 | b-3 | 1.0 | 100% | 2.6 | o |
| Example 6 | a-1 | 100 | b-3 | 3.0 | 100% | 3.0 | o |
| Comparative Example 1 | a-1 | 100 | — | — | 75% | 3.0 | o |
| Comparative Example 2 | a-1 | 100 | b-3 | 5.0 | 100% | 4.7 | x |

TABLE 4

|  | Polyacetal resin | | Aliphatic carboxylic acid metal salt | | After aging (150° C., 500 hrs.) | | |
| --- | --- | --- | --- | --- | --- | --- | --- |
|  | Type | Amount (parts by weight) | Type | Amount (parts by weight) | Tensile strength retentivity | Degree of discoloration (ΔbL value) | Anti-mold deposit property |
| Example 7 | a-1 | 100 | b-1 | 0.1 | 100% | 2.9 | o |
| Example 8 | a-1 | 100 | b-2 | 0.1 | 100% | 1.9 | o |
| Example 9 | a-1 | 100 | b-5 | 0.1 | 100% | 2.4 | o |
| Example 10 | a-1 | 100 | b-6 | 0.1 | 100% | 2.9 | o |
| Example 11 | a-1 | 100 | b-7 | 0.1 | 100% | 2.7 | o |
| Example 12 | a-1 | 100 | b-8 | 0.1 | 100% | 2.4 | o |
| Example 13 | a-1 | 100 | b-9 | 0.1 | 100% | 2.5 | o |
| Example 14 | a-2 | 100 | b-3 | 0.1 | 100% | 1.2 | o |
| Example 15 | a-3 | 100 | b-3 | 0.1 | 100% | 0.9 | o |
| Comparative Example 3 | a-1 | 100 | b-4 | 0.1 | 93% | 1.4 | o |
| Comparative Example 4 | a-1 | 100 | b-10 | 0.1 | 100% | 4.2 | x |

TABLE 5

|  | Polyacetal resin | | Aliphatic carboxylic acid metal salt | | Antioxidant | | Amide compound | | Mold release agent | | After aging (150° C., 500 hrs.) | | |
| --- | --- | --- | --- | --- | --- | --- | --- | --- | --- | --- | --- | --- | --- |
|  | Type | Amount (parts by weight) | Type | Amount (parts by weight) | Type | Amount (parts by weight) | Type | Amount (parts by weight) | Type | Amount (parts by weight) | Tensile strength retentivity | Degree of discoloration (ΔbL value) | Anti-mold deposit property |
| Example 16 | a-1 | 100 | b-3 | 0.03 | c-1 | 0.2 | d-1 | 0.025 | g-1 | 0.1 | 100% | 1.8 | o |
| Example 17 | a-3 | 100 | b-3 | 0.03 | c-1 | 0.2 | d-1 | 0.025 | g-1 | 0.1 | 100% | 0.9 | o |
| Comparative Example 5 | a-1 | 100 | b-10 | 0.03 | c-1 | 0.2 | d-1 | 0.025 | g-1 | 0.1 | 100% | 4.8 | x |
| Example 18 | a-1 | 100 | b-3 | 0.1 | c-2 | 0.3 |  |  | g-3 | 0.2 | 100% | 1.8 | o |
| Example 19 | a-3 | 100 | b-3 | 0.1 | c-2 | 0.3 |  |  | g-3 | 0.2 | 100% | 1.0 | o |
| Comparative Example 6 | a-1 | 100 | b-10 | 0.1 | c-2 | 0.3 |  |  | g-3 | 0.2 | 100% | 5.4 | x |

TABLE 6

| | Polyacetal resin | | Aliphatic carboxylic acid metal salt | | Antioxidant | | Amide compound | | Formic acid scavenger | | Mold release agent | | After aging (150° C., 500 hrs.) | | Anti-mold deposit property |
|---|---|---|---|---|---|---|---|---|---|---|---|---|---|---|---|
| | Type | Amount (parts by weight) | Type | Amount (parts by weight) | Type | Amount (parts by weight) | Type | Amount (parts by weight) | Type | Amount (parts by weight) | Type | Amount (parts by weight) | Tensile strength retentivity | Degree of discoloration ($\Delta$bL value) | |
| Example 20 | a-1 | 100 | b-3 | 0.2 | c-1 | 0.3 | d-1 | 0.05 | e-1 | 0.3 | g-1 g-2 | 0.2 0.6 | 100% | 2.1 | o |
| Example 21 | a-3 | 100 | b-3 | 0.2 | c-1 | 0.3 | d-1 | 0.05 | e-1 | 0.3 | g-1 g-2 | 0.2 0.6 | 100% | 1.1 | o |
| Comparative Example 7 | a-1 | 100 | b-10 | 0.2 | c-1 | 0.3 | d-1 | 0.05 | e-1 | 0.3 | g-1 g-2 | 0.2 0.6 | 100% | 5.6 | x |

TABLE 7

| | Polyacetal resin | | Aliphatic carboxylic acid metal salt | | Amide compound | | Formic acid scavenger | | Light stabilizer | | Mold release agent | | After aging (150° C., 500 hrs.) | | Anti-mold deposit property |
|---|---|---|---|---|---|---|---|---|---|---|---|---|---|---|---|
| | Type | Amount (parts by weight) | Type | Amount (parts by weight) | Type | Amount (parts by weight) | Type | Amount (parts by weight) | Type | Amount (parts by weight) | Type | Amount (parts by weight) | Tensile strength retentivity | Degree of discoloration ($\Delta$bL value) | |
| Example 22 | a-1 | 100 | b-3 | 0.05 | d-1 | 0.05 | e-1 | 0.3 | f-1 f-2 | 0.5 0.25 | g-3 | 0.35 | 100% | 5.5 | o |
| Example 23 | a-3 | 100 | b-3 | 0.05 | d-1 | 0.05 | e-1 | 0.3 | f-1 f-2 | 0.5 0.25 | g-3 | 0.35 | 100% | 4.1 | o |
| Comparative Example 8 | a-1 | 100 | b-10 | 0.05 | d-1 | 0.05 | e-1 | 0.3 | f-1 f-2 | 0.5 0.25 | g-3 | 0.35 | 100% | 8.4 | x |

TABLE 8

| | Polyacetal resin | | Aliphatic carboxylic acid metal salt | | Antioxidant | | Amide compound | | Light stabilizer | | After aging (150° C., 500 hrs.) | | Anti-mold deposit property |
|---|---|---|---|---|---|---|---|---|---|---|---|---|---|
| | Type | Amount (parts by weight) | Type | Amount (parts by weight) | Type | Amount (parts by weight) | Type | Amount (parts by weight) | Type | Amount (parts by weight) | Tensile strength retentivity | Degree of discoloration ($\Delta$bL value) | |
| Example 24 | a-1 | 100 | b-3 | 0.05 | c-1 | 0.3 | d-1 | 0.1 | f-3 | 0.070 | 100% | 2.8 | o |
| Example 25 | a-3 | 100 | b-3 | 0.05 | c-1 | 0.3 | d-1 | 0.1 | f-3 | 0.075 | 100% | 1.6 | o |
| Comparative Example 9 | a-1 | 100 | b-10 | 0.05 | c-1 | 0.3 | d-1 | 0.1 | f-3 | 0.075 | 100% | 5.7 | x |

TABLE 9

| | Polyacetal resin | | Aliphatic carboxylic acid metal salt | | Amide compound | | Formic acid scavenger | | Light stabilizer | | Mold release agent | | After aging (150° C., 500 hrs.) | | Anti-mold deposit property |
|---|---|---|---|---|---|---|---|---|---|---|---|---|---|---|---|
| | Type | Amount (parts by weight) | Type | Amount (parts by weight) | Type | Amount (parts by weight) | Type | Amount (parts by weight) | Type | Amount (parts by weight) | Type | Amount (parts by weight) | Tensile strength retentivity | Degree of discoloration (bL value) | |
| Example 26 | a-1 | 100 | b-3 | 0.05 | d-1 | 0.05 | e-1 | 0.3 | f-1 f-2 f-4 | 0.5 0.25 0.25 | g-2 g-3 | 1.0 0.05 | 100% | 5.7 | o |
| Example 27 | a-3 | 100 | b-3 | 0.05 | d-1 | 0.05 | e-1 | 0.3 | f-1 f-2 f-4 | 0.5 0.25 0.25 | g-2 g-3 | 1.0 0.05 | 100% | 4.2 | o |

TABLE 9-continued

| | Polyacetal resin | | Aliphatic carboxylic acid metal salt | | Amide compound | | Formic acid scavenger | | Light stabilizer | | Mold release agent | | After aging (150° C., 500 hrs.) | | Anti-mold deposit property |
|---|---|---|---|---|---|---|---|---|---|---|---|---|---|---|---|
| | Type | Amount (parts by weight) | Type | Amount (parts by weight) | Type | Amount (parts by weight) | Type | Amount (parts by weight) | Type | Amount (parts by weight) | Type | Amount (parts by weight) | Tensile strength retentivity | Degree of discoloration (bL value) | |
| Comparative Example 10 | a-1 | 100 | b-10 | 0.05 | d-1 | 0.05 | e-1 | 0.3 | f-1 f-2 f-4 | 0.5 0.25 0.25 | g-2 g-3 | 1.0 0.05 | 100% | 9.2 | x |

TABLE 10

| | Polyacetal resin | | Aliphatic carboxylic salt metal salt | | Antioxidant | | Amide compound | | Formic acid scavenger | |
|---|---|---|---|---|---|---|---|---|---|---|
| | Type | Amount (parts by weight) | Type | Amount (parts by weight) | Type | Amount (parts by weight) | Type | Amount (parts by weight) | Type | Amount (parts by weight) |
| Example 28 | a-3 | 100 | b-3 | 0.03 | c-1 | 0.2 | d-2 | 0.1 | | |
| Example 29 | a-3 | 100 | b-3 | 0.05 | | | d-1 | 0.05 | e-2 | 0.3 |
| Example 30 | a-3 | 100 | b-3 | 0.05 | | | d-1 | 0.05 | e-1 | 0.3 |
| Example 31 | a-4 | 100 | b-3 | 0.1 | | | | | | |

| | Light stabilizer | | Mold release agent | | After aging (150° C., 500 hrs.) | | Anti-mold deposit property |
|---|---|---|---|---|---|---|---|
| | Type | Amount (parts by weight) | Type | Amount (parts by weight) | Tensile strength retentivity | Degree of discoloration (ΔbL value) | |
| Example 28 | | | g-1 | 0.1 | 100% | 1.0 | ○ |
| Example 29 | f-1 f-2 f-4 | 0.5 0.25 0.25 | g-2 g-3 | 1.0 0.05 | 100% | 4.4 | ○ |
| Example 30 | f-5 f-2 | 0.5 0.25 | g-3 | 0.35 | 100% | 4.2 | ○ |
| Example 31 | | | | | 100% | 1.0 | ○ |

TABLE 11

| | Polyacetal resin | | Aliphatic carboxylic acid metal salt | | After aging (150° C., 500 hrs.) | | Anti-mold deposit property |
|---|---|---|---|---|---|---|---|
| | Type | Amount (parts by weight) | Type | Amount (parts by weight) | Tensile strength retentivity | Degree of discoloration (ΔbL value) | |
| Example 32 | a-1 | 100 | b-11 | 0.1 | 100% | 1.5 | ○ |
| Comparative Example 11 | a-1 | 100 | b-12 | 0.1 | 100% | 4.0 | ○ |

Industrial Applicability

The polyacetal resin composition of the present invention has excellent thermal aging resistance and excellent aging discoloration resistance, so that it solves the problems which are encountered when a shaped article produced from a conventional polyacetal resin composition is used in a high-temperature atmosphere, namely, the problems of low mechanical properties and poor appearance. Further, since the polyacetal resin composition of the present invention has also excellent anti-mold deposit properties, it can improve the molding productivity as well. Thus, the polyacetal resin composition of the present invention can be extremely advantageously used for various applications, especially, production of mechanical parts which will be used under high temperature conditions for a prolonged period of time.

We claim:

1. A polyacetal resin composition comprising 100 parts by weight of a terminal-stabilized polyacetal resin, and from 0.01 to 3.0 parts by weight of at least one aliphatic carboxylic acid metal salt added to said terminal-stabilized polyacetal resin, said at least one aliphatic carboxylic acid metal salt having occluded therein at least one metal compound selected from the group consisting of a metal hydroxide and a metal chloride, and having attached to a surface thereof at least one metal compound selected from the group consisting of a metal hydroxide and a metal chloride, wherein the at least one occluded metal compound and the at least one surface-attached metal compound are, respectively, present in an amount of from 1 to 300 ppm by weight and in an amount of from 0 to 20 ppm by weight, each based on the total weight of said at least one aliphatic carboxylic acid metal salt, said at least one occluded metal compound and said at least one surface-attached metal compound.

2. The resin composition according to claim 1, wherein the metal of said at least one aliphatic carboxylic acid metal salt is selected from the group consisting of calcium, magnesium, barium, zinc and strontium.

3. The resin composition according to claim 1, wherein the metal of said at least one occluded metal compound is selected from the group consisting of sodium, potassium, lithium, calcium, magnesium, barium, zinc and strontium.

4. The resin composition according to claim 1, wherein said terminal-stabilized polyacetal resin is one which generates formaldehyde gas in an amount of 600 ppm by weight or less, based on the weight of said polyacetal resin, when heated at 230° C. for 60 minutes in a nitrogen stream.

5. The resin composition according to claim 1, which further comprises from 0.1 to 5.0 parts by weight of at least one additive selected from the group consisting of an antioxidant, a polymer containing a formaldehyde-reactive nitrogen atom, a formic acid scavenger, a light stabilizer and a mold release agent.

6. The resin composition according to claim 5, wherein said antioxidant is at least one hindered phenol antioxidant.

7. The resin composition according to claim 5, wherein said polymer containing a formaldehyde-reactive nitrogen atom is at least one member selected from the group consisting of a polyamide resin, polyacrylamide and a derivative thereof, and a copolymer of acrylamide with another vinyl monomer.

8. The resin composition according to claim 5, wherein said formic acid scavenger is at least one member selected from the group consisting of an amino-substituted triazine compound, an addition product between an amino-substituted triazine compound and formaldehyde and a polycondensate between an amino-substituted triazine compound and formaldehyde.

9. The resin composition according to claim 5, wherein said light stabilizer is at least one member selected from the group consisting of a benzotriazole ultraviolet ray absorber, an oxalic anilide ultraviolet ray absorber and a hindered amine light stabilizer.

10. The resin composition according to claim 5, wherein said mold release agent is at least one member selected from the group consisting of a fatty acid ester, a polyalkylene glycol and an amido group-containing aliphatic compound.

* * * * *